(12) United States Patent
Gahinet et al.

(10) Patent No.: US 7,865,254 B2
(45) Date of Patent: Jan. 4, 2011

(54) MODELING OF CONTROL SYSTEMS WITH OPEN-LOOP REPRESENTATIONS AND FACTORIZATION OF COMPONENTS

(75) Inventors: Pascal Gahinet, Hopkinton, MA (US); John Glass, Franklin, MA (US); Alec Stothert, Westborough, MA (US); Craig Buhr, Franklin, MA (US)

(73) Assignee: The MathWorks, Inc., Natick, MA (US)

( * ) Notice: Subject to any disclaimer, the term of this patent is extended or adjusted under 35 U.S.C. 154(b) by 314 days.

(21) Appl. No.: 11/977,299

(22) Filed: Oct. 24, 2007

(65) Prior Publication Data

US 2008/0172212 A1 Jul. 17, 2008

Related U.S. Application Data

(60) Provisional application No. 60/880,238, filed on Jan. 11, 2007.

(51) Int. Cl.
*G05B 13/02* (2006.01)
*G06G 7/48* (2006.01)

(52) U.S. Cl. ............................... 700/37; 700/29; 703/6; 703/13

(58) Field of Classification Search .................. 700/17, 700/28, 29, 32, 37, 42; 703/3, 4, 6, 7, 13, 703/14, 22
See application file for complete search history.

(56) References Cited

U.S. PATENT DOCUMENTS 5,909,661 A * 6/1999 Abramovitch et al. ...... 702/191
7,035,037 B2 * 4/2006 Tao et al. .................. 360/77.02
7,437,201 B2 * 10/2008 Cullen ......................... 700/29
7,474,494 B2 * 1/2009 Atsumi et al. ............. 360/77.08
7,599,752 B2 * 10/2009 Chen ........................... 700/28
2006/0112382 A1 * 5/2006 Glass et al. ................. 717/168

OTHER PUBLICATIONS

Johansson, M. et al., "Interactive Tools for Education in Automatic Control," *IEEE Control Systems*, vol. 18(3):33-40 (1998).

The MathWorks, "Control System Toolbox, for Use with MatLab, Getting Started, Version 5," The MathWorks, Inc. (2001).

(Continued)

*Primary Examiner*—Charles R Kasenge
(74) *Attorney, Agent, or Firm*—Lahive & Cockfield, LLP; Kevin J. Canning; Neslihan I. Doran

(57) ABSTRACT

A method of manipulating a block diagram model with a plurality of graphical modeling components by defining an open loop anywhere on the block diagram model is provided. Graphical modeling components in series with the open loop may be automatically recognized and a plurality of parameters of the graphical modeling components in series with the open loop may be displayed on a display device. A user may simultaneously tune the parameters of the graphical modeling components in series with the open loop. Factorization points breaking the block diagram model in two disconnected parts may be identified in the block diagram model. A virtual graphical model may be generated by replacing a pattern of the graphical modeling components between two factorization points with a single graphical modeling component representing the pattern.

23 Claims, 17 Drawing Sheets

OTHER PUBLICATIONS

National Instruments, "MATRIXx, SystemBuild User Guide," (2004).

Invitation to Pay Additional Fees for Application No. PCT/US2008/000269, dated Sep. 26, 2008.

The MathWorks, "Control System Toolbox, For Use with Matlab, Using the Control System Toolbox, Version 5," The MathWorks, Inc. (2002).

European Office Action for Application No. 08713055.5, dated Feb. 23, 2010.

* cited by examiner

MODELING OF CONTROL SYSTEMS WITH OPEN-LOOP REPRESENTATIONS AND FACTORIZATION OF COMPONENTS

RELATED APPLICATION

This application claims priority to, and the benefit of, U.S. Provisional Application No. 60/880,238, filed on Jan. 11, 2007, for all subject matter common to both applications. The disclosure of the above-mentioned application is hereby incorporated by reference herein in the entirety.

BACKGROUND

A control system may include a combination of components (electrical, mechanical, thermal, hydraulic, etc.) that act together to maintain system performance close to a desired set of performance specifications. Common types of control systems may include open-loop control systems and closed-loop control systems. Open-loop control systems are those in which the output does not affect the input. Examples of open-loop control systems may include control systems for an automatic toaster or an alarm clock. Closed-loop control systems are those in which the output has effects on the input in such a way as to maintain a desired output value. Examples of closed-loop control systems may include thermostats, engine governors and automotive cruise-control systems.

Components in a control system may be changed to modify operation of the control system. The process of changing the parameters of the components of a control system is referred to as "tuning" the control system. A conventional approach for tuning control systems is to treat a compensator as a single element. A "compensator," as used herein, refers to a gain or dynamic system whose parameters are manipulated to modify the performance of a control system. Tuning control systems may be necessary for many reasons, such as to include traditional software architecture organization, to address the need for controller mode shifting or to model initialization considerations.

Compensators may be formed of multiple components. If the compensator can be represented as a single element, the user may tune the parameters of one element as opposed to parameters of the multiple components forming the compensator. However, it is often problematic to represent a compensator as a single element in a free form modeling environment, where a given compensator can spread across multiple components. In a free form modeling environment, the users may create designs as if using a whiteboard. The user may create objects and relationships without concern about incomplete specifications, consistent typology, or formal correctness. As such, it may be very difficult for a user to define boundaries of a compensator in a free form modeling environment.

SUMMARY

In one embodiment, a computer-readable medium holding computer executable instructions that when executed on a processing device manipulate a block diagram with a plurality of graphical modeling components may be provided. The medium may include one or more instructions for defining an open loop location in the block diagram in accordance with a first user input and automatically recognizing graphical modeling components that are in series with the open loop location, the graphical modeling components having parameters. The medium may also include one or more instructions for displaying a plurality of parameters of the graphical modeling components that are in series with the open loop location on a display device. One or more parameters of the graphical modeling components in series with the open loop location may be tuned simultaneously in accordance with a second user input. The medium may further include one or more instructions for tuning the poles and zeros of components.

In another embodiment, a computer-readable medium holding computer executable instructions that when executed on a processing device analyze a block diagram having a plurality of graphical modeling components may be provided. The medium may include one or more instructions for identifying factorization points in the block diagram, each factorization point identifies the location where the block diagram can be partitioned into two disconnected parts to facilitate processing of the block diagram. Modeling components between two factorization points may be identified. A pattern of the graphical modeling components between two factorization points may be automatically recognized. A virtual block diagram may be generated, where the pattern of the graphical modeling components may be replaced with a single graphical modeling component representing the pattern. The medium may further include one or more instructions to identify whether the block diagram model is a closed-loop block diagram model. An open loop location may be defined on the graphical model in accordance with a user input, when the graphical model is a closed-loop graphical model. The block diagram model may be stored with the open loop location.

In another embodiment, a method of manipulating a block diagram model, the method may be provided. The method may include defining an open loop location in the block diagram model based on a first user input, the block diagram model represented by a plurality of graphical modeling components that include parameters. The graphical modeling components that are in series with the open loop location may be automatically identified. The method may also include displaying at least a portion of parameters of the graphical modeling components that are in series with the open loop location on a display device.

In another embodiment, a system for interacting with a block diagram may be provided. The system may include processing logic that identifies a location on the block diagram based on a system instruction. The processing logic may also insert an open loop into the block diagram at the identified location and tune one or more parameters of the block diagram, where the tuning is related to the location at which the open loop is inserted into the block diagram. The processing logic may produce an output based on the tuning, wherein the output modifies operation of the block diagram. The system may further include display logic that displays the block diagram to a user, and displays the open loop, the parameters, tuned parameters, or the output to the user to facilitate user interaction with the block diagram.

BRIEF DESCRIPTION OF THE DRAWINGS

The accompanying drawings, which are incorporated in and constitute a part of this specification, illustrate one or more embodiments of the invention and, together with the description, explain the exemplary embodiments. In the drawings.

DETAILED DESCRIPTION

Figure 1A:
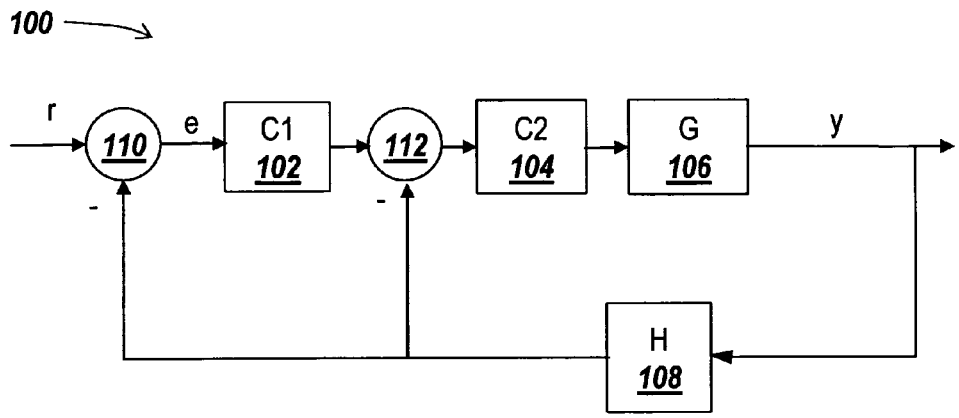
FIG. 1A illustrates a conventional graphical model representation of a control system.

Control systems can maintain a prescribed relationship between the output and the input of the system such control systems may be referred to as a "closed-loop control systems." This prescribed relationship may be maintained by comparing the output of the control system with the input of the control system and using the difference between the output and the input to control the system. Closed-loop control systems are often referred as "feedback control systems" because the output is fed back to a controller for comparison with the input of the system, where the input is fed to the same controller.

In some implementations, control systems may be modeled by graphical modeling environments. In these graphical modeling environments, the control system may be modeled as a graphical model. The graphical model may provide a convenient environment from which to interpret model components and/or structure. The graphical model may also provide a visual representation that allows a user to gain a quick intuitive notion of system behavior. The components of the graphical model may capture a mathematical representation of the control system being modeled.

A graphical modeling environment may allow users to perform numerous types of tasks including constructing, editing and saving graphical models via a user interface. For example, the graphical modeling environment may allow users to draft block diagram models representing control systems and augment a pre-defined set of blocks with user-specified (or customized) blocks. The graphical model may allow users to perform still other operations, such as using the block diagram model to compute or trace the temporal evolution of a control system ("executing" the block diagram), and generating code from the graphical model representing the control system.

Block diagrams are used in modeling control systems. Block diagrams are graphical entities having an "executable meaning" that are created within graphical modeling environments for modeling static and dynamic systems, and generally comprise one or more graphical modeling components. For example, a block diagram model of a dynamic system is represented schematically as a collection of graphical modeling components. The graphical modeling components include nodes that are interconnected by lines. The lines represent relationships between the graphical objects.

In one subset of block diagram types, the nodes are referred to as "blocks" and are drawn using some form of geometric object (e.g., circle, rectangle, etc.). The line segments are referred to as "signals." Signals correspond to the time-varying quantities represented by each line connection and are assumed to have values at each time instant when connected to an enabled node. Each node may represent an elemental dynamic system, and the relationships between signals and state variables are defined by sets of equations represented by the nodes.

Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that in terms of computational causality, the output of the first node is an input to the second node. Each distinct input or output on a node is referred to as a port.

The source node of a signal writes to the signal at a given time instant when its system equations are solved. The destination node of this signal reads from the signal when their system equations are being solved. Those skilled in the art will recognize that the term "nodes" does not refer exclusively to elemental dynamic systems but may also include other modeling elements that aid in readability and modularity of block diagrams.

FIG. 1A illustrates an exemplary graphical model of a conventional closed-loop control system 100. System 100 may include summation point 102, controller C1 104, summation point 106, controller C2 108, plant block G 110 and filter 112. Summation points 102, 106 may include logic that performs an operation on one or more signals. For example, summation point 102 may receive an input signal "r" and may add or subtract another signal to "r" or to produce an output signal, such as an error signal "e." The error "e," calculated at summation point 102, is equal to the difference between the input "r" and the output "y." Controller blocks C1 104 and C2 108 may include logic that performs an operation on an input signal to produce an output signal. For example, controller C1 104 may apply an algorithm to an input signal to produce an output signal. In one embodiment, controllers C1 and C2 108 can apply control parameters to a signal. Plant block G 110 may include logic that represents the system, process or device that is being controlled. Plant block G 110 may apply an algorithm defined by the underlying subsystem to an input signal to produce an output signal. The filter H 112 may include logic that performs pre-defined operations on an input signal.

In FIG. 1A, input signal "r" goes through summation block 102. Output "y" of system 100 is also fed to summation block 102. Summation block 102 takes the difference between input "r" and output "y" to calculate error "e." Error "e" is the input signal for controller C1 102. The output of controller C1 102 and the output of filter H 112 are fed into summation block 106. Summation block 106 calculates the difference between the output of controller C1 104 and the output of filter H 112. The output of summation block 106 passes through controller C2 108 and is fed into plant G 110. The output of plant G 110 is the output "y" of system 100. The output "y" passes through filter H 112 and is fed back to two summation blocks 102, 106.

Controllers C1 104, C2 108 and filter H 112 provide locations for control system parameters to be designated and/or system performance to be tracked. Controllers C1 104 and C2 108 may receive inputs and/or feedback. The design of controllers C1 104 and C2 108 on the feedback loops may require the user to define elements C1 104, C2 108 and H 112 as the controllers in the model. The parameters of the controllers can be modified according to design requirements.

Figure 1B:
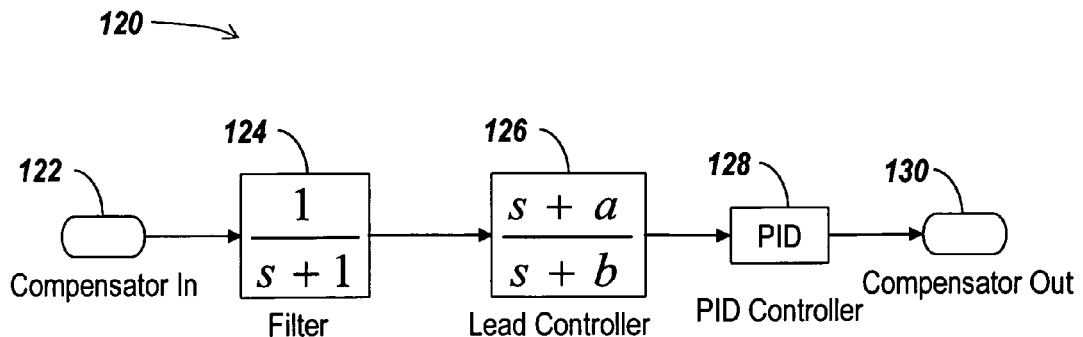
FIG. 1B illustrates a conventional compensator design.

Controllers 104, 108 may be combined to form one or more compensators. For example FIG. 1B illustrates different components of a compensator 120. Compensator 120 with input 122 and output 130 may be described by a series connection of filter 124, lead controller 126, and Proportional/Integral/Derivative (PID) controller 128.

One or more user interfaces can be used to allow a user to insert and/or modify compensators in a model. In addition, user interfaces may be provided in the modeling environment for other functions, such as to analyze a closed-loop control system representation or to find an open-loop control system representation. Still other user interfaces may be provided for performing other functions, such as interactively tuning design parameters of a control system model and viewing results of the tuning. These user interfaces can include graphical interfaces, such as editors, which enable the users to modify variables such as gain and other dynamics of each compensator. The user interfaces may further include text based interfaces.

In complex systems (e.g., cars, airplanes, hard disk drives, etc.), there may be numerous control systems that regulate processes making up the overall system. Multiple control systems making up the overall system may be analyzed and/or tuned simultaneously. Typically control system design and analysis may involve breaking up individual control systems into different components within the larger system. For example, these components may be components such as noise filters, lead-lag components, and PID controllers. These components may represent, in aggregate, a compensator. A user may be interested in the behavior of the compensator as a whole; however the user may be required to implement the compensator using a collection of components when working with conventional techniques.

Exemplary Embodiments

Exemplary embodiments illustrated herein, may eliminate the need for a user to specify compensator boundaries. In contrast with conventional techniques, that may require specification of boundaries, exemplary embodiments illustrated herein enable the user to directly specify the location for an open-loop in the model instead of specifying the compensator boundaries. For example, the user may identify the blocks of the control system through a user interface, such as, a graphical user interface. The identified blocks may be part of a feedback loop and/or blocks in series with an open-loop location that can be directly tuned.

Users may look at the open-loop response of a control system to predict or obtain insight from the closed-loop response of the system. The open-loop response of a control system gives an indication about the closed-loop behavior of the control system. One purpose of the open-loop response of a control system is to tune controllers of a system by modifying their parameters. Typical design techniques using open-loop responses are not limited to and include Bode, root locus, and Nichols plots. In addition there are many techniques that utilize optimization to design an open-loop response like H∞ design.

In an exemplary embodiment, a user may define a desired location for the open-loop. Exemplary implementations may allow the user to select the location of the open-loop in different ways, such as using a pointing device like a mouse, a keyboard or the like. The user may insert an opening at the selected location of the closed-loop system representation to convert the closed-loop system representation to an open-loop system representation. The open-loop system may be tuned by changing parameters of the blocks in series with the open-loop location.

Figure 2A:
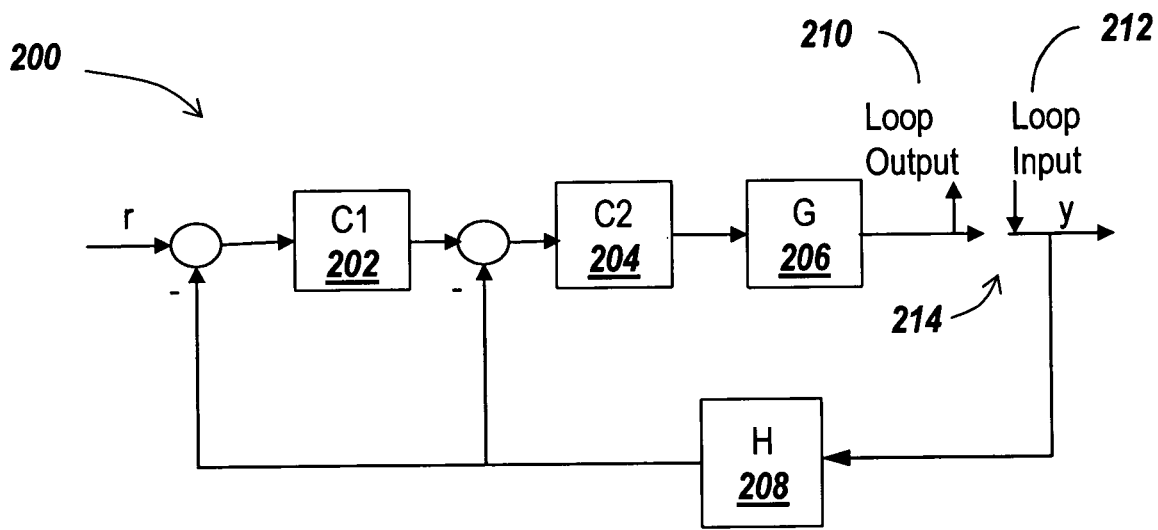
FIG. 2A illustrates an exemplary open-loop control system.

As illustrated in FIG. 2A, the user introduced an open loop at a desired location in a closed-loop open system, creating an exemplary open-loop control system 200. In contrast with conventional techniques requiring the user to define the boundaries of controller C2 204, the user may specify the location of the open loop to create loop output 210 and loop input 212. The open-loop is designed at the output of plant block G 206. The system illustrated in FIG. 2A contains an input "r," an output "y." Controllers C1 202, C2 204, filter H 208 and plant block G 206 representing the system, process or device that is being controlled are provided between controllers C1 202, C2 204. Open-loop output 210 and open-loop input 212 indicate the location of the open-loop of control system 200.

Figure 2B:
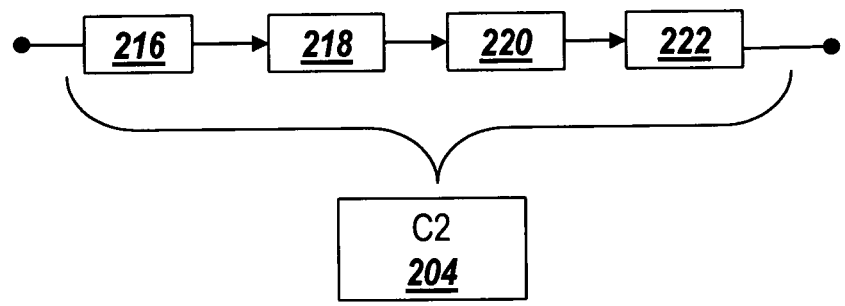
FIG. 2B illustrates an exemplary controller that can be formed from a number of components.

As illustrated in FIG. 2B, controller 204 may be composed of multiple compensator components 216-222. These compensator components 216-222 in series may be tuned simultaneously in exemplary embodiments. An example of a system with compensator components 216-222 in series is an autopilot control loop, where the loop is controlled using multiple components, like a PID and/or lead/lag compensators. To tune these control systems, users may need to be able to tune each of the compensator components 216-222 simultaneously using a design tool.

Figure 3:
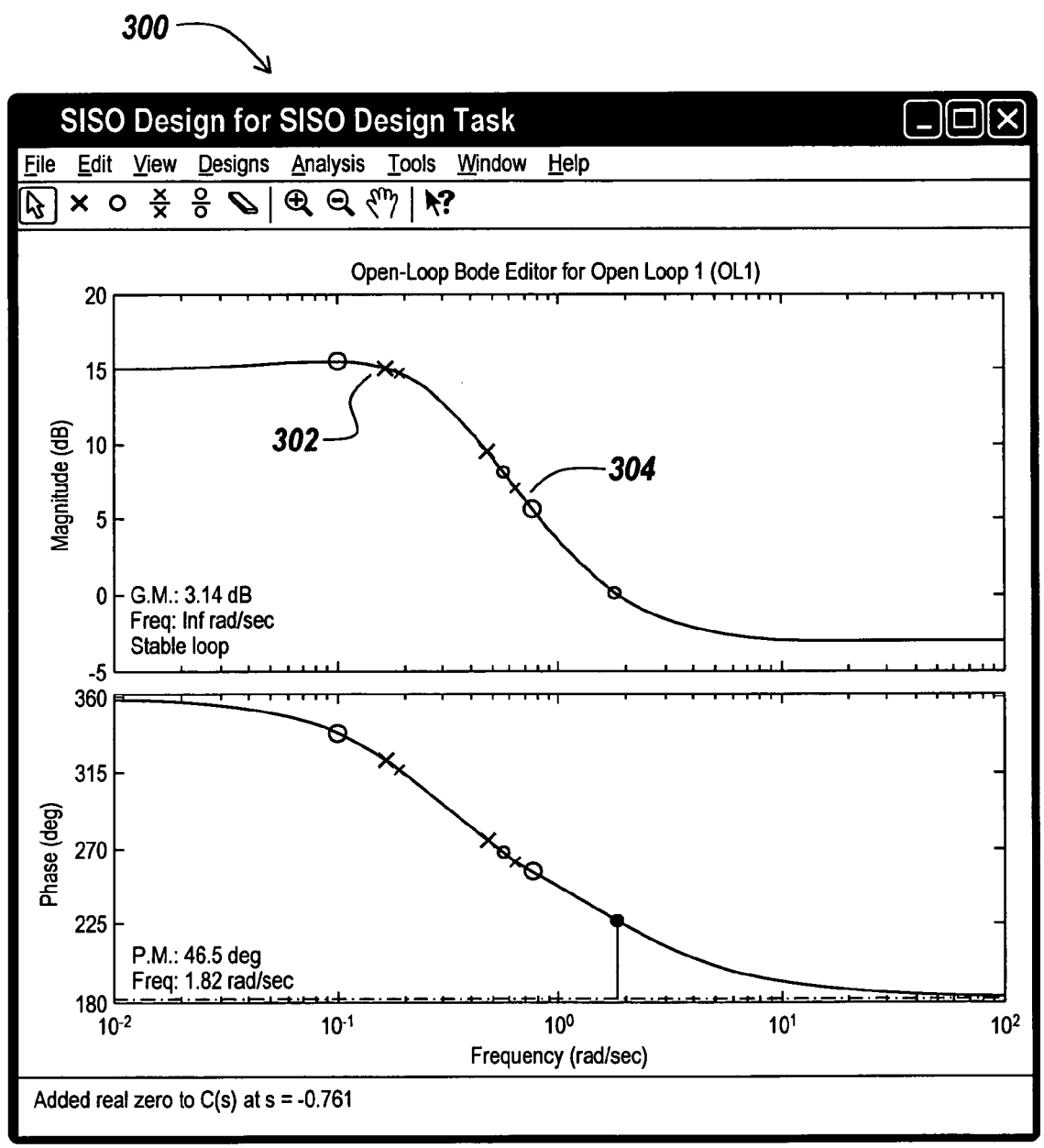
FIG. 3 illustrates exemplary Bode plots of an open-loop control system.

If a user tunes the parameters of controller C2 204, (for example, to increase the gain of the controller C2 204) the gain of the overall open loop system may automatically increase. This occurs because processing logic determines that controller C2 204 is in series with open loop location 214. Similarly, filter H 208 is also in series with open loop location 214 and benefits from the same open loop design techniques. Controller C1 202 is not in series with respect to open loop location 214, and design tools may not allow this controller to be designed using linear open-loop techniques. FIG. 3 shows Bode design 300 of the open-loop system illustrated in FIG. 2A. Since controller C2 and filter H are in series, poles and zeros 302 of controller C2 and poles and zeros 304 of filter H can be tuned simultaneously. The user may define a new open loop location in series with controller C1 202 in order to tune the parameters of controller C1 202.

In graphical block diagram programming languages, users may represent compensator components using rudimentary components, such as gains, integrators, summation components, etc. When tuning these compensator components, it may not be particularly useful to tune the gains individually as this would require more time and additional effort. Tuning the gains individually may also require the user tune one gain, look at the overall result, tune the next gain and check to see if there is an improvement in the overall result. It may be more useful to tune the compensator components as a whole to increase design efficiency. Simultaneous tuning of multiple components provides the user with quick insight into the effect of the parameter changes, for example, incremental changes, on an overall design. Exemplary embodiments enable the tuning of the compensator components as a whole.

Figure 4A:
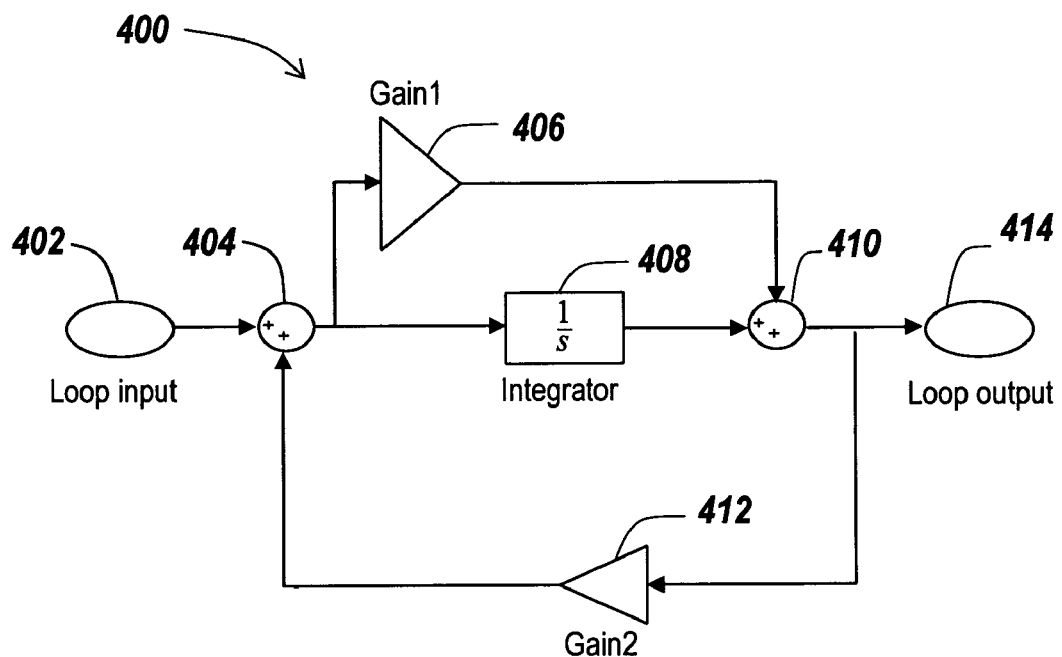
FIG. 4A illustrates an exemplary lead/lag controller design.

An example is a lead/lag controller 400, as illustrated in FIG. 4A. Lead/lag controller 400 is built using multiple rudimentary components. Lead/lag controller 400 is built from loop input block 402, summation point 404, gain block 406, integrator 408, summation point 410, gain block 412 and loop output block 414. Loop input 402 and loop output 414 blocks identify the input and the output of the lead/lag controller 400, respectively. Tuning lead/lag controller 400 as a whole may be more efficient than tuning individual gains 406 and 412.

Accordingly, in one embodiment, a user may be interested in tuning the poles and zeros of lead/lag controller 400 instead of individual gains 406 and 412. The poles and zeros may be calculated using the following formula:

$$K(s) = \frac{s + \text{Gain1}}{s + \text{Gain}}$$

Figure 4B:
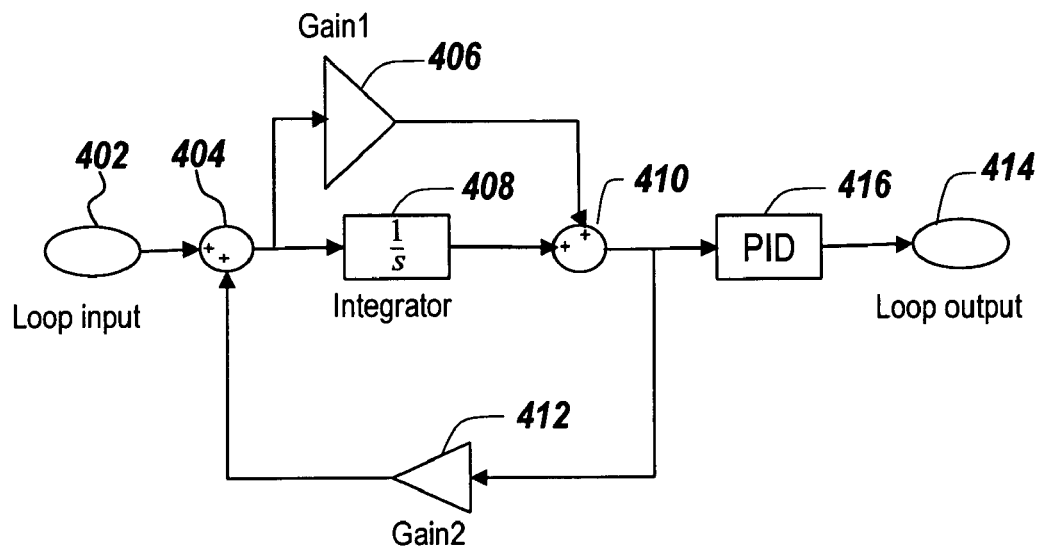
FIG. 4B illustrates an exemplary block diagram that includes the lead/lag controller shown in FIG. 4A.

FIG. 4B shows a block diagram model of a control system with a lead/lag controller 400. An open-loop design tool may be used to tune the values of blocks Gain1 406 and Gain2 412. The open-loop design tool may use the pole and zero representation of a lead/lag compensator and PID controller 416.

A graphical modeling tool illustrated herein may identify the compensator components that are in series for each of the loops of a graphical model. The graphical modeling tool may allow users to tune the individual compensator components within a single graphical modeling tool. The compensator components may include compensator sub-components such as gains, integrators, summation components, etc. selected by the user. The user may then tune the parameters of blocks that are in series within the open-loop system using open-loop control design techniques. When tuning each loop using a design tool like a Bode plot, the components that are in series may be presented within a single graphical modeling tool.

Figure 5A:
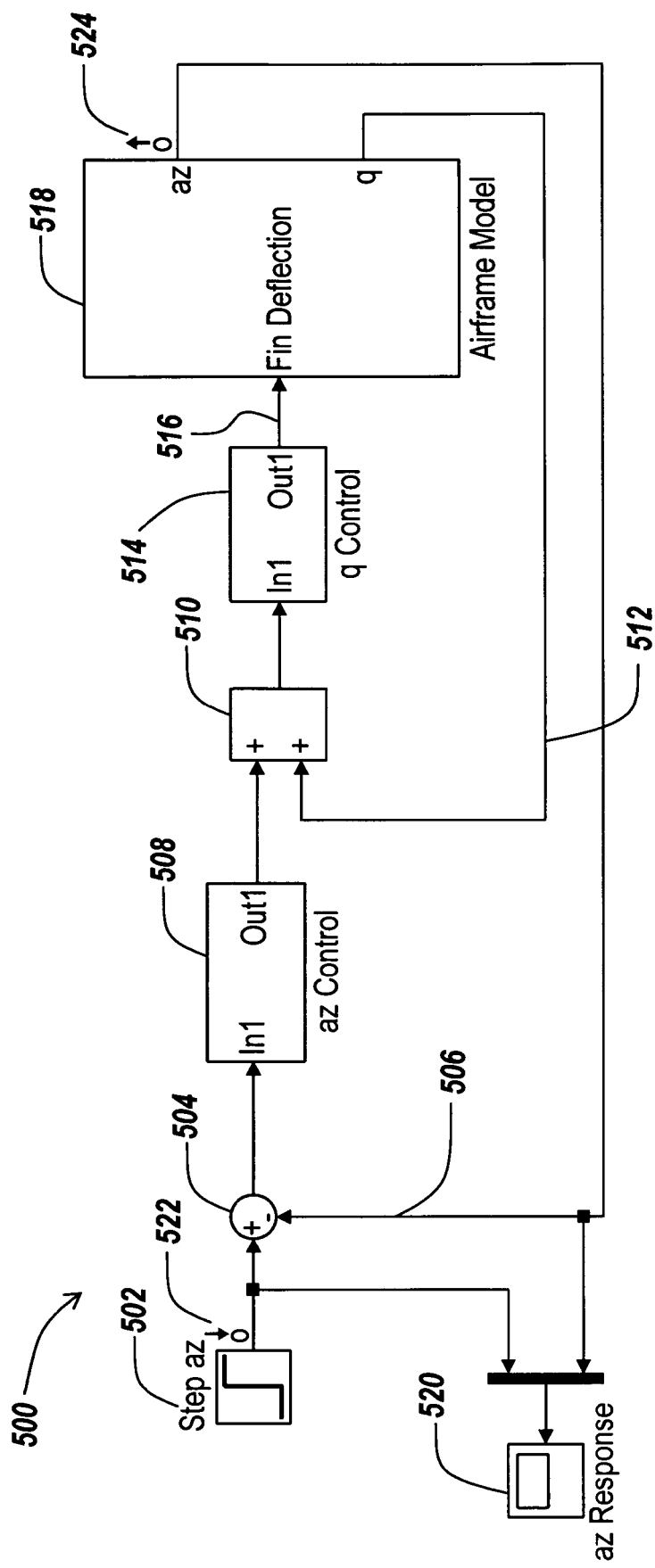
FIG. 5A illustrates a graphical model of a closed-loop control system.
Figure 5B:
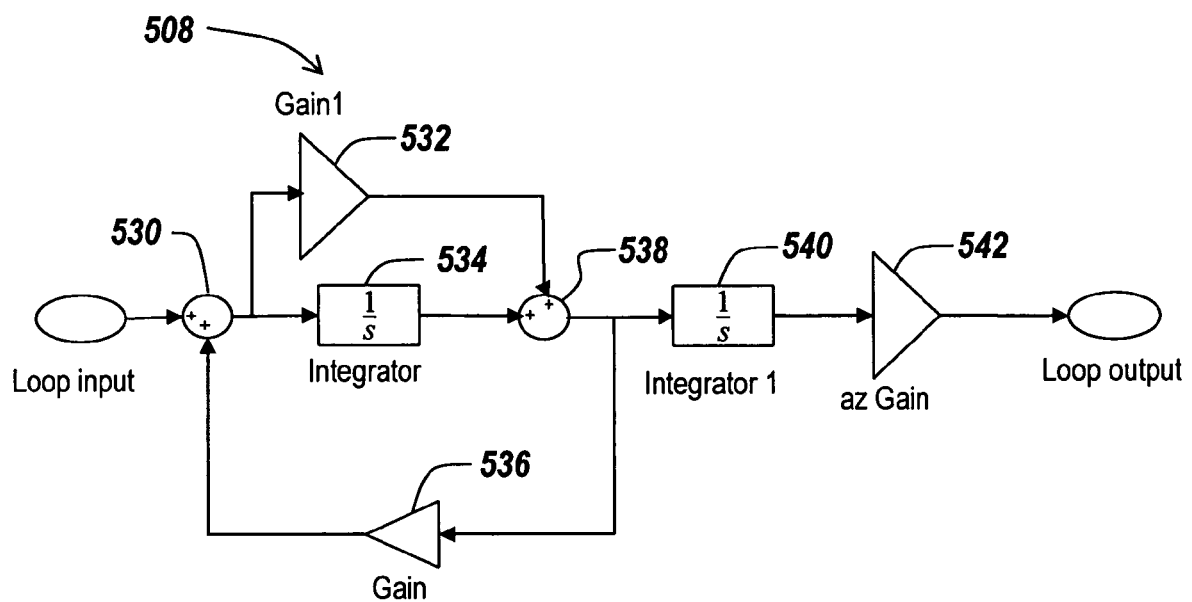
FIG. 5B illustrates components of a subsystem of the control system illustrated in FIG. 5A.

The following description illustrates an example of how a user may specify the open-loop location in exemplary embodiments. FIG. 5A illustrates a closed-loop control system 500 that may be used to tune airframe autopilot gains. The first element of the block diagram is acceleration (az) step block 502. Az step block 502 is a source block from which a step input signal originates. The step signal is first passed to summation point 504. Summation point 504 compares the step input signal with acceleration (az) 506 output signal. The output of summation point 504 is fed into acceleration (az) Control block 508. Az Control block 508 may contain multiple components as illustrated in FIG. 5B.

Summation block 510 is used in adding the output of az control block 508 and body rate (q) output signal 512. Airframe model block 518 has two outputs, acceleration (az) 506 and body rate (q) 512. Closed-loop control system 500 introduces the process of designing two cascaded feedback loops 506 and 512. The feedback loop structures in FIG. 5A use the body rate (q) output signal 512 for an inner feedback loop and acceleration (az) output signal 506 for an outer feedback loop. The output of control system 500 is plotted using a scope block, here az response block 520. Scope block 520 is a sink block used to display a signal like an oscilloscope. Linearization input 522 and linearization output 524 points can be placed on signal lines in the model to define closed-loop systems. For example, linearization input point 522 can be placed on the az step signal 502 and linearization output point 524 can be placed on the acceleration (az) output signal 506. The closed-loop system may include one or more blocks in the path between input 522 and output 524 points.

In the exemplary model illustrated in FIG. 5A, q Control 514 and az Control 508 are two feedback controllers that may be tuned. The design requirements of the control system may require that a user tune the components of az Control block 508, illustrated in FIG. 5B. The components of az Control block 508 are components representing a lead compensator (Summation 530, Gain1 532, Integrator 534, Gain 536, Summation 538), integrator 540 and gain block 542. In the exemplary embodiment, the user may tune gain 542, Gain1 532 and Gain 536 at the same time to achieve a desired response of the system 500. The user may only choose az Control 508 block as a tunable block, and all tunable components of az Control 508, namely gain 542, Gain1 532 and Gain 536, will be selected for tuning.

Figure 5C:
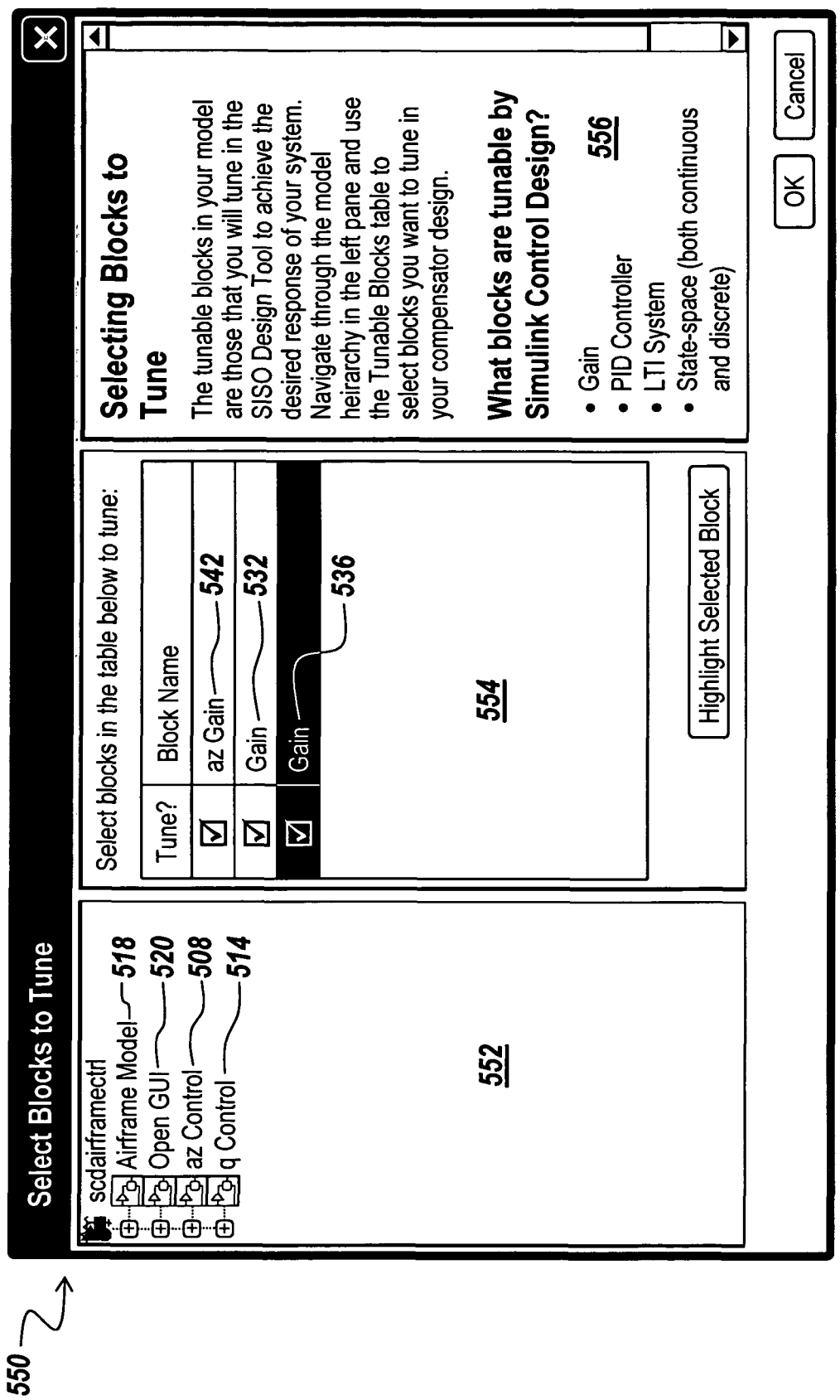
FIG. 5C illustrates an exemplary user interface that can be used to tune components of a subsystem of the graphical model illustrated in FIG. 5A.
Figure 5D:
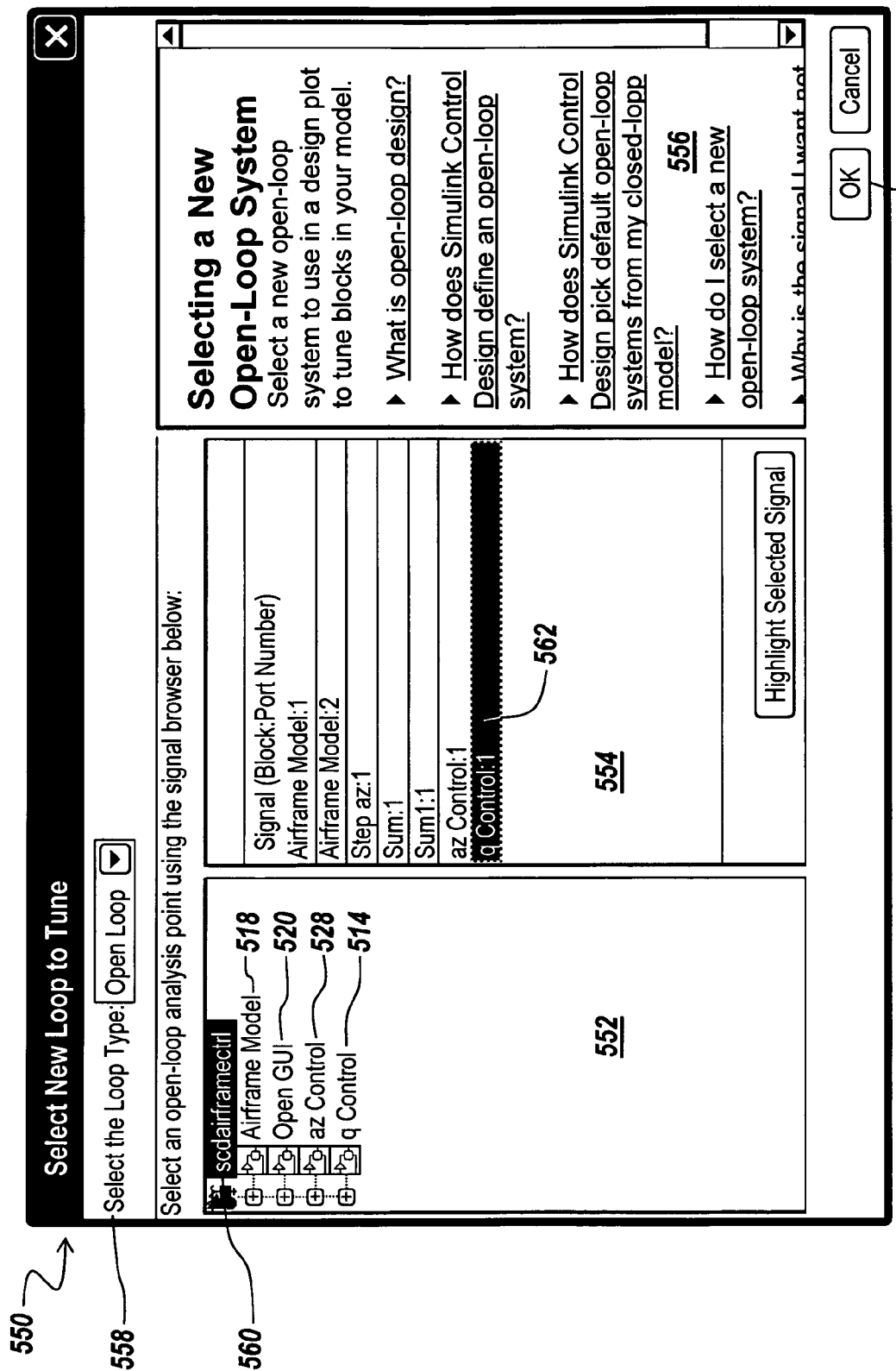
FIG. 5D illustrates an exemplary user interface that can be used to tune components of a loop of the graphical model illustrated in FIG. 5A.

The user interface 550 shown in FIGS. 5C-5D may be used to select the location of an open-loop. User interface 550 of FIGS. 5C-5D is intended to be illustrative and other types of user interfaces may be used.

User interface 550 illustrated in FIG. 5C enables a user to select the blocks to be tuned. User interface 550 may include a first pane 552 showing the subsystems of the control system. For example, the subsystems illustrated in FIG. 5C are airframe model 518, open GUI 520, az Control 508 and q Control 514. User interface 550 may also include a second pane 554 to select the blocks that the user would like to tune. All of the components of control system model 560 are shown on second pane 554 of user interface 550. First pane 552 indicates that the control system model 560 is formed of subsystems such as the airframe subsystem 518, the GUI 520, the az control 508 and the q control 514. The "+" signs next to the subsystems indicate that each subsystem is formed from components that may be seen by selecting the "+" sign.

For example, FIG. 5C illustrates that az Control 508 is selected in the first pane 552. Second pane 554 illustrates the components of az Control 508 that may be tuned. The components are Gain 536, Gain1 532, and az Gain 542. As illustrated in FIG. 5C, the user may select all components as blocks to tune. Similarly, the user may select the components of another subsystem, for example, q Control 514 to tune. User interface 550 may also include a help pane 556 to assist the user in navigating through the application.

User interface 550 illustrated in FIG. 5D enables a user to select the loop to be tuned. FIG. 5D illustrates an exemplary user interface 550 where the user is asked to select loop type 558 that the user would like to tune. If the user chooses to analyze open loops, first pane 552 indicates available open loop analysis points. In this illustrated example, the user chooses control system model 560. Control system model 560 is highlighted to indicate that the user selected control system model 560 to see the components of control system model 560.

FIG. 5D illustrates that second pane 554 of user interface 550 contains a list of the blocks of control system 500. The blocks of control system 500 are displayed with the port numbers associated with each block. For example, airframe model 518 has two output ports, numbered "1" and "2." Step az 502 has only one output port, numbered "1." A user may select an output port of a block of interest from the list displayed on second pane 554 of user interface 550. In the illustrated example of FIG. 5D, q Control block 514 and corresponding output port 1 (qcontrol:1) 562 is selected using an input device such as a mouse, a keyboard or the like. The block and output port of interest may be indicated by a visual cue, for example by highlighting, after selection. The user may confirm the selection by selecting OK 564. As a result, an open-loop may be introduced at output 516 of q Control block 514.

Figure 6:
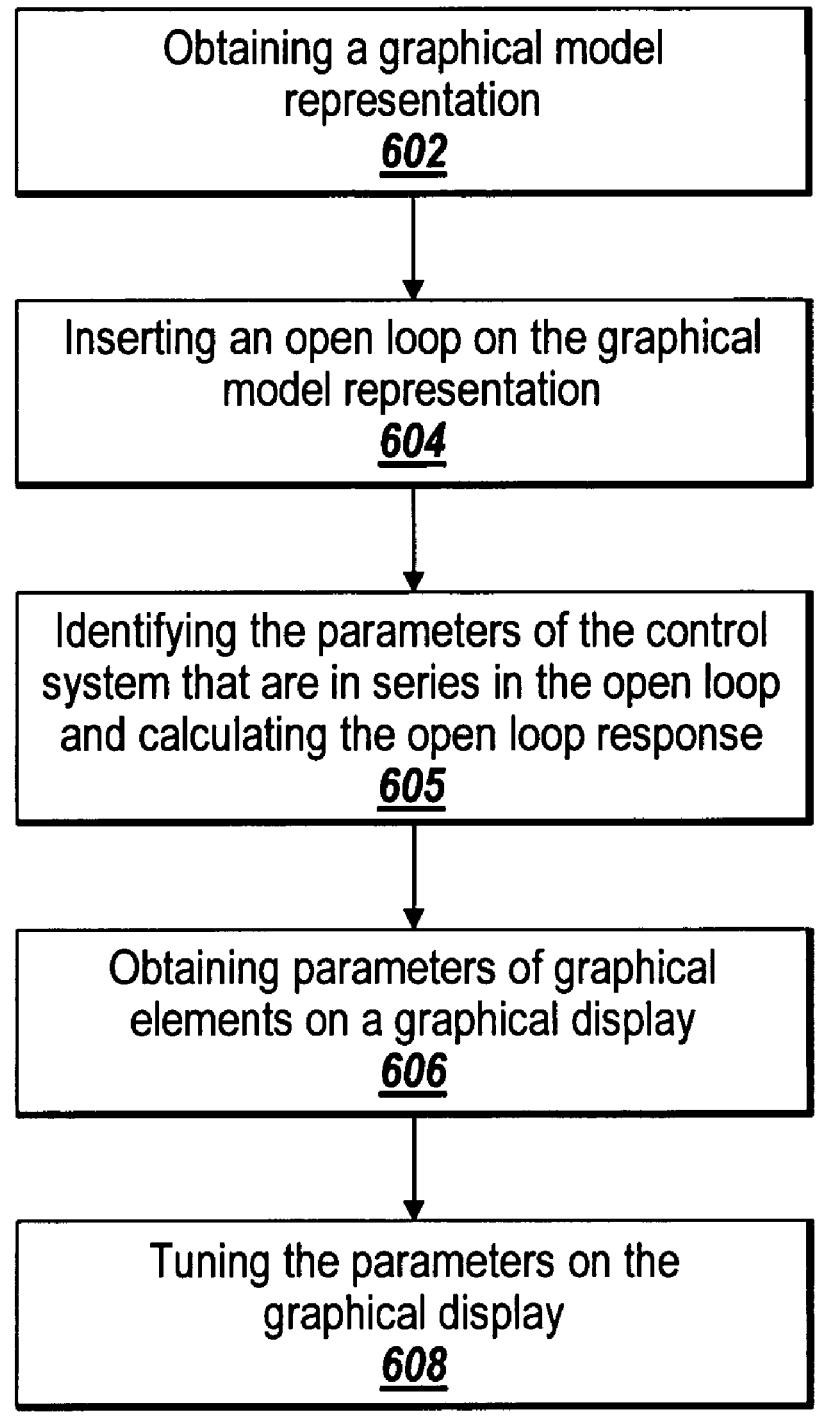
FIG. 6 is a flowchart illustrating exemplary processing for defining an open-loop on a representation of a graphical model.

FIG. 6 is a flow chart illustrating an exemplary technique for performing control system analysis using the graphical modeling tool and the user interface described above. Initially, a graphical model representation may be obtained (step 602). The user may introduce an open-loop location 214 on representation 200 via the user interface to tune components of the graphical model (step 604). Analysis tools associated with the graphical model representation may be used to calculate open-loop response 300. For example, open-loop response 300 may be calculated by identifying the parameters of the control system that are in series in open-loop 214 (step 605). Graphical modeling representation 500 may have one or more components 502-542. The parameters of these graphical modeling components 502-542 may be identified and displayed as tunable parameters using open-loop control design techniques (step 606). The user may tune the parameters on display (step 608). User interface 550 illustrated in FIGS. 5C-5D may be used in tuning the parameters of graphical modeling components 502-542. The representation of the system may be automatically updated with the new parameters entered by the user. As such, the user may see the effect of the changes directly after modifying the parameters.

Figure 7:
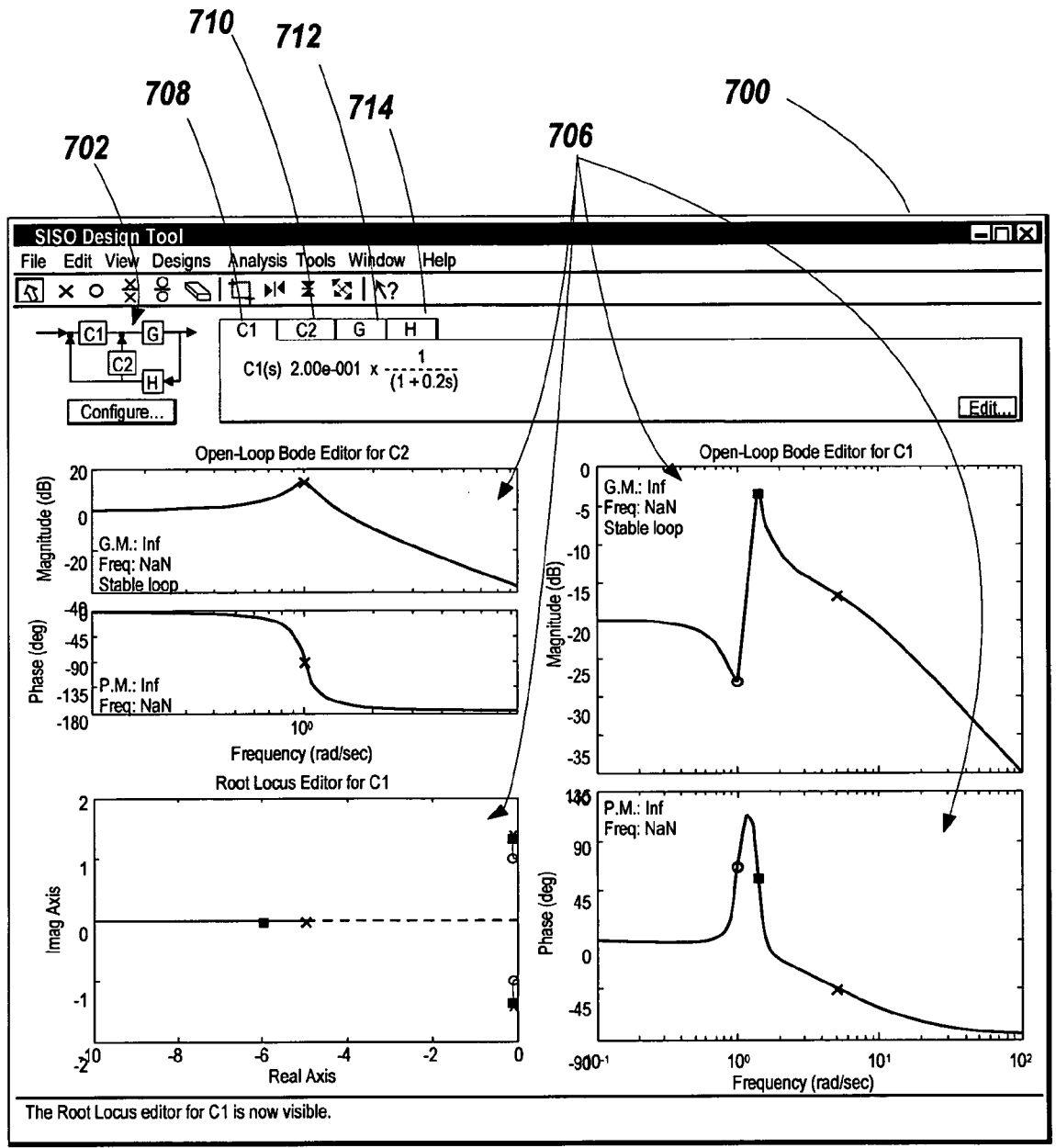
FIG. 7 illustrates an exemplary user interface for an exemplary embodiment.

FIG. 7 illustrates a graphical user interface (GUI) for graphical modeling tool 700. Graphical modeling tool 700 may have a number of different layouts and may provide a number of different types of information to a user. The user interface described herein may be incorporated into graphical modeling tool 700 that may be used for tuning a control system. The control system to be tuned may be illustrated by small graphical representation 702 on the graphical modeling tool.

In FIG. 7, a two-loop control system 702 with controllers C1 and C2 is shown. Design interface 704 may provide a user or other system with access to the different inputs of controllers C1 and C2 of control system 702. For example, design interface 704 may include graphical editor 706 that allows users to edit the gain and/or the dynamics of individual controllers C1 and C2. Separate tabs 708-714 may be used to tune the components of the control system illustrated in small graphical representation 702. Graphical editor 706 may display standard plots for analyzing and/or tuning control systems. The standard plots and tools may include, but are not limited to, root locus plots, open-loop Bode plots, open-loop Nichols charts, a closed-loop plot, a discretization tool, a tuning tool, and other tuning techniques known in the art and as may be considered useful in analysis, design, and tuning of the control systems. Design interface 704 may also include one or more tools that allow the user to interact with the standard plots identified above.

The above discussion of FIG. 7 identifies how to convert a closed-loop block diagram into an open-loop block diagram by inserting an open loop in the closed-loop block diagram. The parameters of the components of the open-loop control system may then be identified and tuned according to specific design requirements. A design tool, such as design tool 700 described above, may be used in tuning the parameters of an open-loop control system. The design tool may graphically display the effects of the changes implemented by the user to increase design efficiency. Before tuning the parameters, the user may have a good understanding of the open-loop system behavior. Providing the user with an analysis of the control system enables the user to make educated changes to the parameters of the system. A description of exemplary graphical model analysis methods is provided below.

Analyzing Open-Loop Graphical Models

Once an open-loop graphical model is obtained by defining an open-loop location on a closed-loop system as described above, the open-loop graphical model may be analyzed using two approaches: a loop factorization algorithm and a compensator component pattern recognition algorithm. These approaches enable the user to customize tuning of the parameters of the open-loop graphical model components. These algorithms are described in detail below.

I. Loop Factorization Algorithm

An exemplary technique for analyzing sections of the open-loop that are in series may be implemented in a number of ways. For example, a graph bi-directional depth first search routine may be employed to identify cut vertices or articulation points of the graphical model. In the graph bi-directional depth first search routine, an articulation point is a vertex in a graph where, if broken, separates the graph into two disconnected pieces.

The use of the graph bi-directional depth first search routine is only for illustrative purposes and should not be construed as limiting. The graph bi-directional depth first search routine is not the only algorithm that may be used in exemplary implementations of graphical model analysis. Other graph analysis techniques, such as breadth-first search, iterative-deepening search, depth-limited search, bidirectional search, uniform-cost search, etc., that have been applied in network analysis, chemistry and physics may be used along with or instead of the graph bi-directional depth first search routine.

A block diagram needs to be translated to a graph suitable for the depth first search analysis before applying the depth first search routine. This translation may require identifying nodes of the graph in a model and/or identifying articulation points in the graph using a depth first search, or other appropriate techniques. In one embodiment, the nodes are identified to be the blocks and their output ports. Articulation points that are output ports of blocks represent factorization points in the model. A factorization point identifies a location where the model can be partitioned into two disconnected parts to facilitate the processing of the model.

Figure 8A:
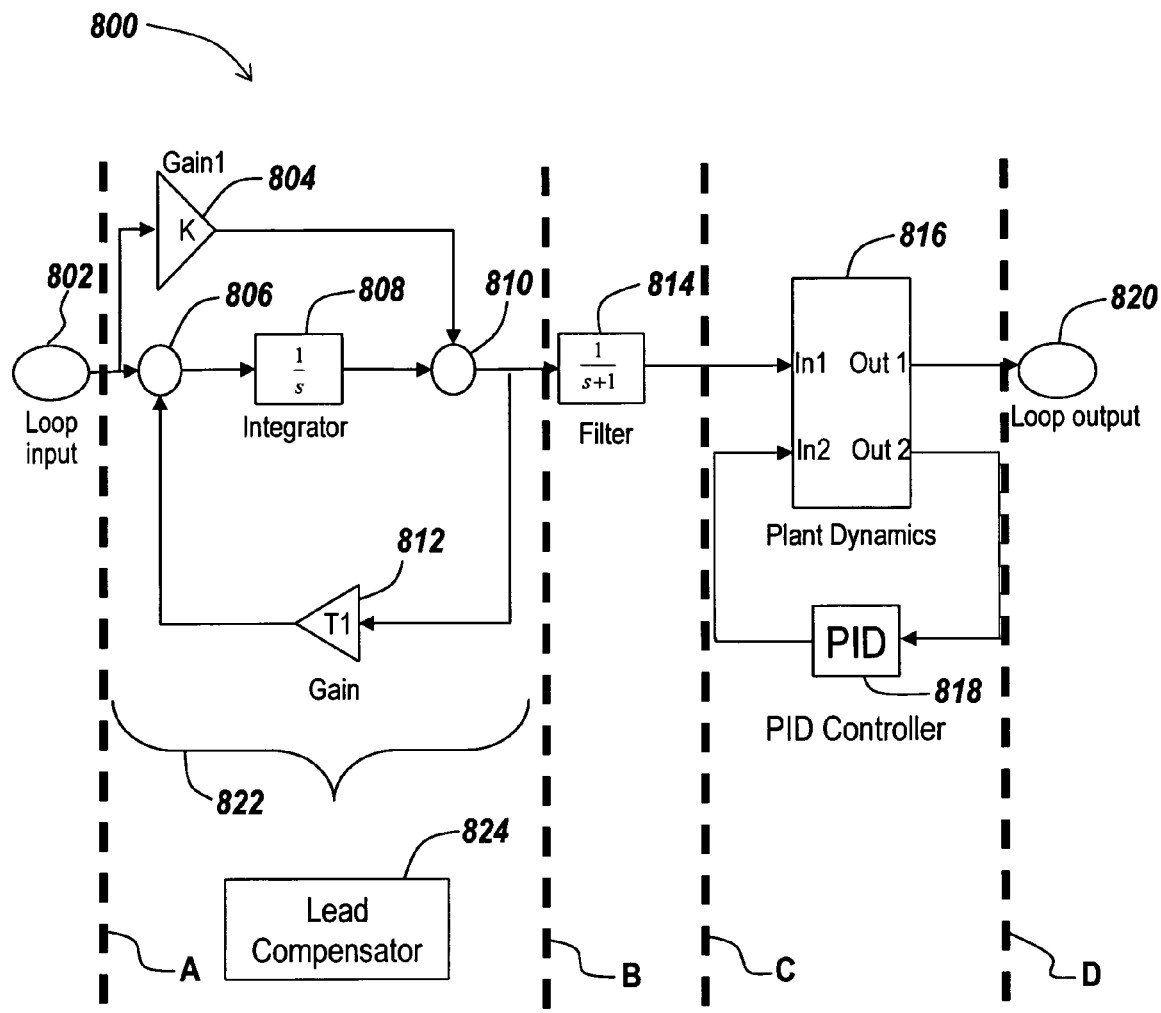
FIG. 8A illustrates a block diagram model with factorization points.

FIG. 8A illustrates an exemplary open-loop block diagram 800 where factorization points have been identified. The input of open-loop block diagram 800 is indicated by a loop input 802. The input signal is fed in Gain 1 804 and summation point 806. Summation point 806 compares the input signal with a feedback signal from Gain block 812. The output of summation point 806 is the input of integrator 808. The output of integrator 808 and the output of Gain 1 804 are added in summation point 810. The output of summation point 810 is fed back to summation point 806 after passing through gain block 812. The output of summation point 810 is also fed into filter 814. Plant 816 has two input ports and two output ports. One input of plant 816 is the output of filter 814. One of the output signals of plant 816 is fed into PID controller 818 and fed back as the second input of plant 816. Second output signal of plant 816 is the output of block diagram 800 indicated by loop output 820.

Figure 8B:
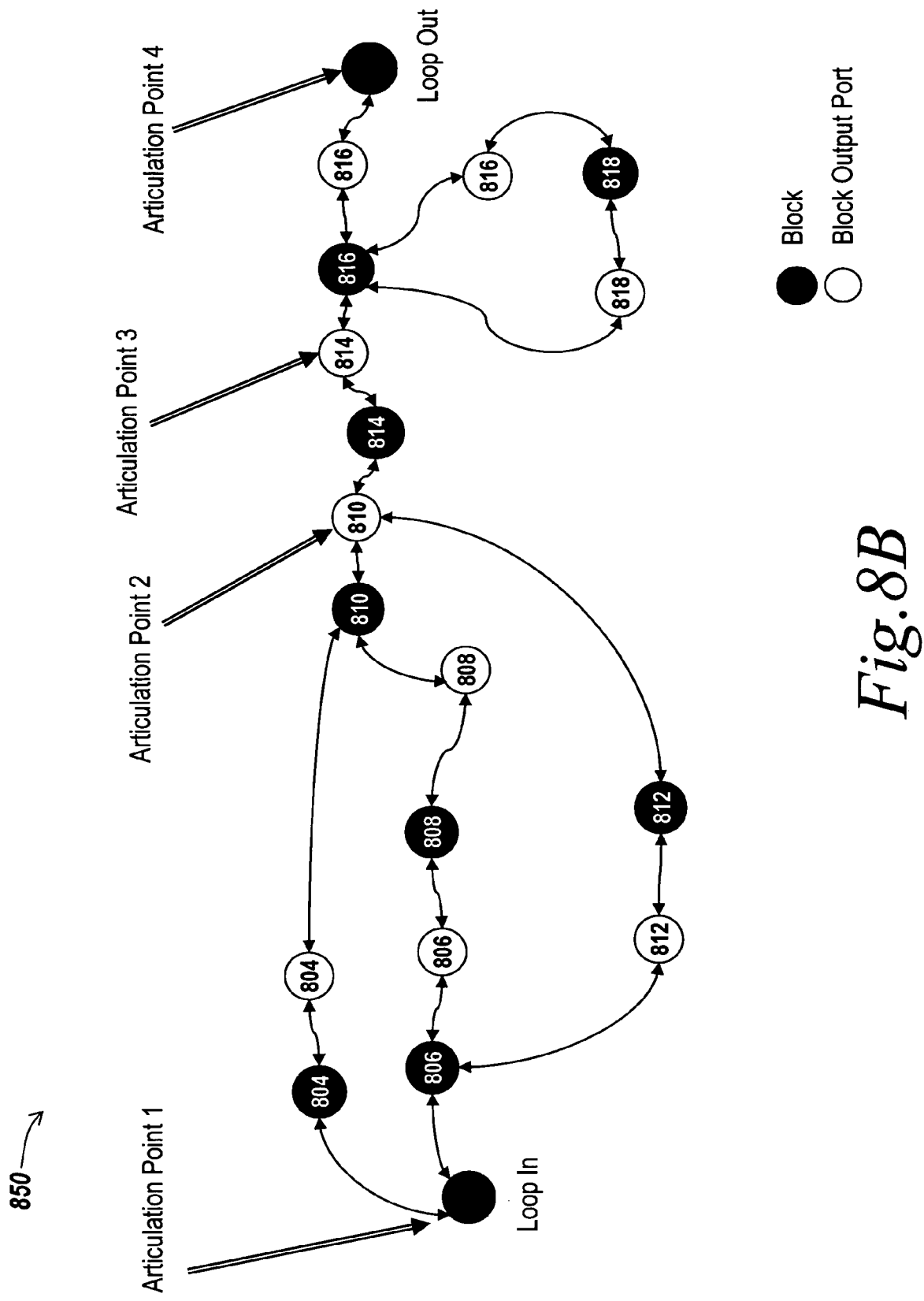
FIG. 8B illustrates a graph bi-directional depth first search routine applied to the block diagram model illustrated in FIG. 8A.

A user may be interested in tuning blocks Gain 1 804, Gain 812, Filter 814 and PID Controller 818. FIG. 8B illustrates a graph bi-directional depth first search routine applied to the block diagram of FIG. 8A. Graph 850 indicates blocks of the block diagram with shaded circles and the block output ports of the block diagram with white circles. The graph search yields four articulation points: one at the beginning of the loop, one at the output of the sum block 810, one at the output of the Filter block 814 and one at the end of the loop.

Applying the results of the FIG. 8B to the graphical model illustrated in FIG. 8A, one may determine that block filter 814 is identified to be in series with the open loop. Block filter 814 may be tuned directly using conventional design tools such as Bode plots. PID controller 818 appears in an inner feedback loop. As such, PID controller 818 may not be directly tuned using conventional design tools, such as Bode plots. The P, I and D gains may be tuned separately, but that may have an indirect effect on the open loop response. Gain 812 and Gain 1 804 blocks may be tuned by changing their parameter values.

II. Exemplary Compensator Component Pattern Recognition Technique

An additional design flexibility that may be integrated into graphical modeling tool 700 is to automatically detect blocks that may be grouped (e.g. factorized) together.

In an exemplary graphical modeling environment, sections of a graphical model may be identified by first identifying the factorization points in the model. The identified sections of the graphical model between the factorization points may be analyzed. The analysis may look for blocks that a user has identified for tuning. The analysis may further identify known diagram structures in a section as control components. If a section is identified as a control component, it may be treated as a single component to tune using open-loop control design techniques. The changes to the single control component may be mapped to the individual blocks being tuned. This procedure may be applied to known control structures such as simple filters, lead/lag controllers, interconnection of gain and state space or transfer function blocks, or PID controllers. The procedure may further be extended to more complex implementations of higher order filters.

In one embodiment, a pattern recognition technique (e.g. a computer executed algorithm) may be implemented using a library of patterns. For example, poles and zeros of a single component representing a pattern may be mapped to actual parameters of blocks in a graphical model. For example, if there are two gains and an integrator in a section of a block diagram, the structure may represent a lead or lag type controller. In this case there may be a pole and a zero in the single component representation of the controller that corresponds to values of the gain blocks of the controller. The single component representation of the controller may correspond to a gain and pole/zero locations that need to be converted to the parameters of the blocks that are being tuned.

The relationship between the single component representation and the parameters of the block diagram blocks may be described by a set of nonlinear algebraic equations. There are some cases where there is an analytical representation to perform this conversion. In other cases, numerical optimization is used to perform the conversion. This technique can be used to handle cases that are useful for control applications, such as interconnections between blocks. Blocks may be gain blocks, integrator blocks, transfer functions, and state space that form components such as simple filters, PED controllers, and lead lag filters. By using the pattern recognition technique, the graphical modeling tool 700 may find patterns that may be converted to a single component representation.

As discussed above, in a block diagram model, components that are in series with the open-loop location may be tuned. Graphical modeling tool 700 may be used to identify factorization points between each individual component or group of components that are in series with the open-loop location. Graphical modeling tool 700 may recognize conventional control patterns such as filters, controllers, transfer function blocks, etc., between the factorization points.

Given the open-loop block diagram 800 of FIG. 8A, a user may be interested in tuning selected blocks, such as, Gain 812, Gain 1 804, Filter 814 and PID Controller 818. A visual inspection of block diagram 800 may yield the following conditions:

Gain 812 and Gain 1 804 blocks can be tuned by changing their values but may have an indirect effect on the open-loop response.

Block filter 814 is in series in the open-loop block diagram 800. Block filter 814 can be tuned directly using open-loop design techniques such as Bode plots.

PID controller 818 appears in an inner feedback loop. PID controller 818 cannot be directly tuned using open-loop design techniques. The P, I and D gains can be tuned but that may have an indirect effect on the open-loop response.

These are the conditions that have also been determined by the graph bi-directional depth first search routine. As indicated above, the articulation points of the bi-directional search routine illustrated in FIG. 8B correspond to the factorization points of the graphical model illustrated in FIG. 8A. Accordingly, the four factorization points of the block diagram model illustrated in FIG. 8A are the following: factorization point A at loop input 802; factorization point B at the output of summation block 810; factorization point C at the output of Filter block 814 which is a part of the overall compensator and the factorization point D at the first output of Plant Dynamics block 816. The collection of blocks between the factorization points A and B represents a lead compensator 822.

Figure 8C:
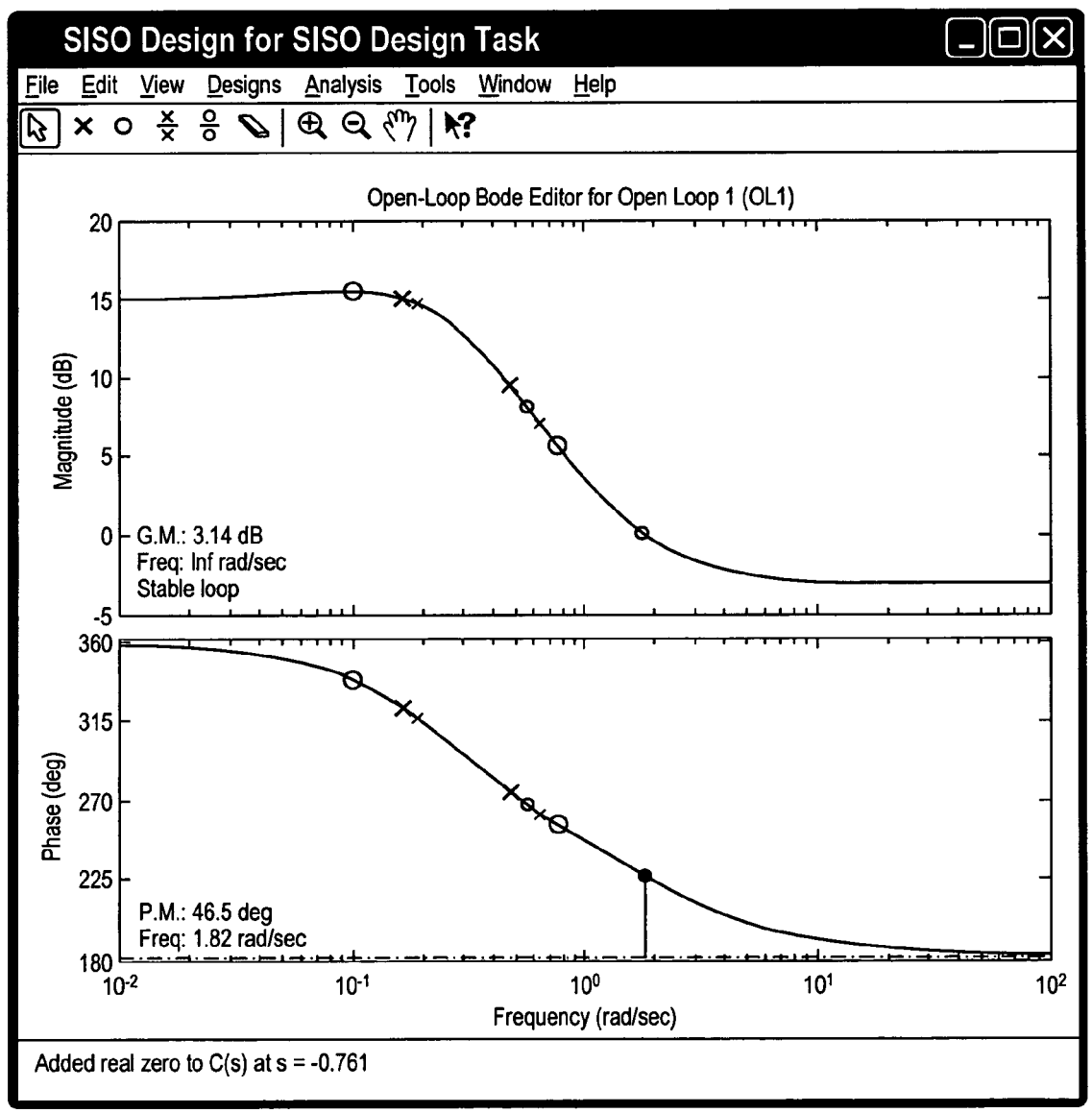
FIG. 8C illustrates an exemplary user interface that can be used to recognize the patterns in the block diagram model illustrated in FIG. 8A.

Lead compensator 822 pattern may be recognized by design tool 860 illustrated in FIG. 8C. Design tool 860 may not modify the original open-loop block diagram 800. Instead, design tool 860 may create a virtual open-loop block diagram where lead compensator pattern 822 may be replaced virtually by a single block 824. The virtual open-loop block diagram does not replace the original block diagram. By virtually replacing lead compensator patter 822 with a single block 824, design tool 860 keeps the original graphical model intact. The virtual block diagram is used during processing of the model. The virtual block diagram may not be presented to the user.

A recognition feature of design tool 860 enables the user to tune a single block 824 representing lead compensator pattern 822 in a graphical editor. This way, the user does not have to tune every component of lead compensator pattern 822. Lead compensator 824 now appears in series and can be tuned using open-loop design techniques. The parameters of open-loop system 800 such as the transfer function or the zeros/poles are calculated using the simplified virtual control system representation. Design tool 860 gives the user the ability to simultaneously tune the parameters of lead compensator 824 and filter 814 on the same graphical editor. In this case, PID controller 818 may not be tuned in design tool 860 on the same graphical editor since PID controller 818 is not in series with the other system controllers 814 and 824.

Figure 9:
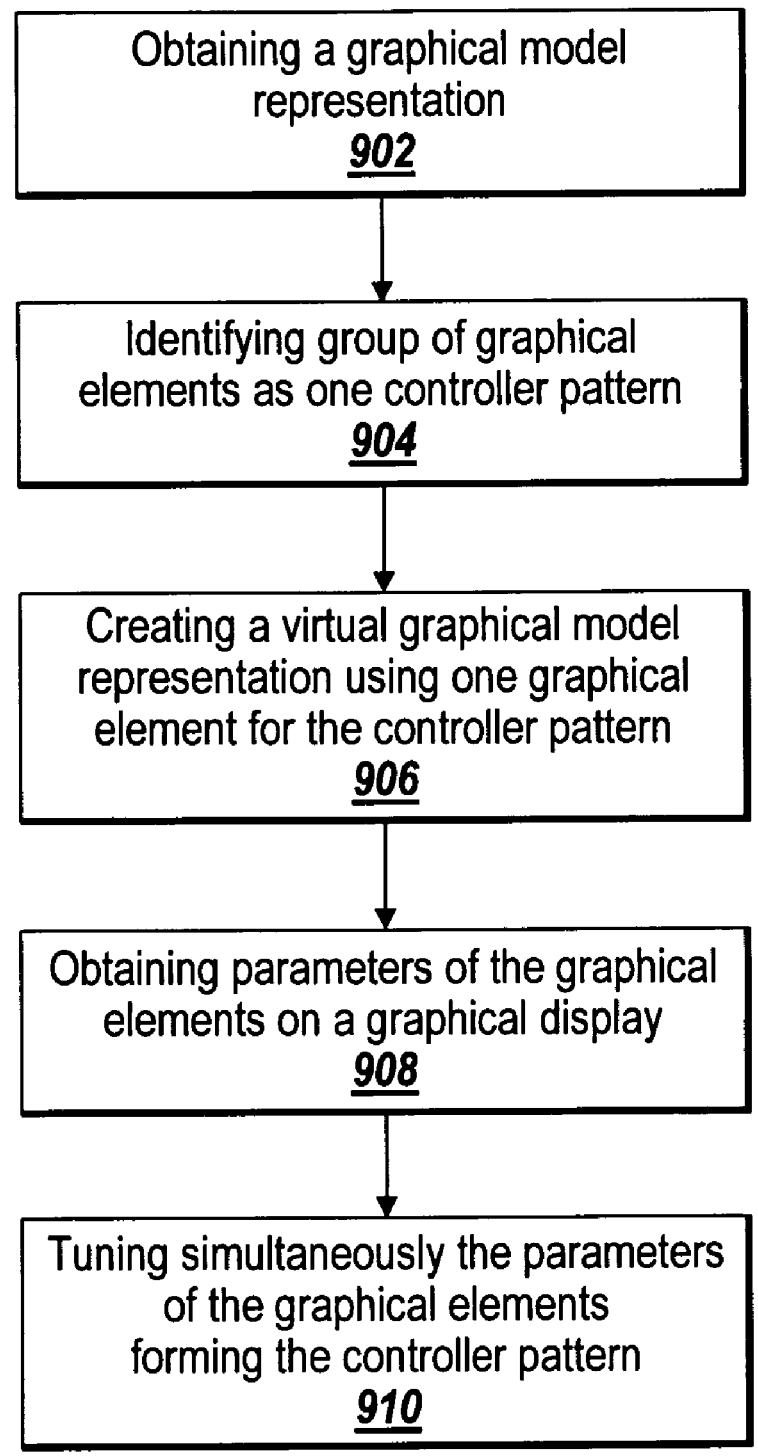
FIG. 9 is a flowchart illustrating exemplary processing for identifying graphical modeling components as a controller pattern.

FIG. 9 illustrates exemplary flowchart of a technique that can be used to perform pattern recognition in exemplary embodiments. The method may begin when a graphical model representation is obtained (step 902). For example, a user may use a block diagram simulation environment to tune the components of a graphical model representation. The user may introduce an open-loop location anywhere on the representation through the user interface (step 904) in order to tune the components. The graphical model representation becomes an open-loop graphical model representation. The open-loop response of the model may be calculated to identify the parameters and sections of the control system that are in series in the open-loop using an analysis tool. The tool may identify controller patterns formed of multiple controller components (step 904) within the open-loop graphical model representation. The tool may then create a virtual graphical model representation by replacing the patterns with a single graphical modeling component (step 906). The user may obtain the parameters of various graphical modeling components on a graphical display (step 908). The user may tune the parameters on the graphical display and the representation of the model may be automatically updated with the new parameters (step 910). The user may repeat step 910 until the user achieves the desired output for the graphical model.

Figure 10:
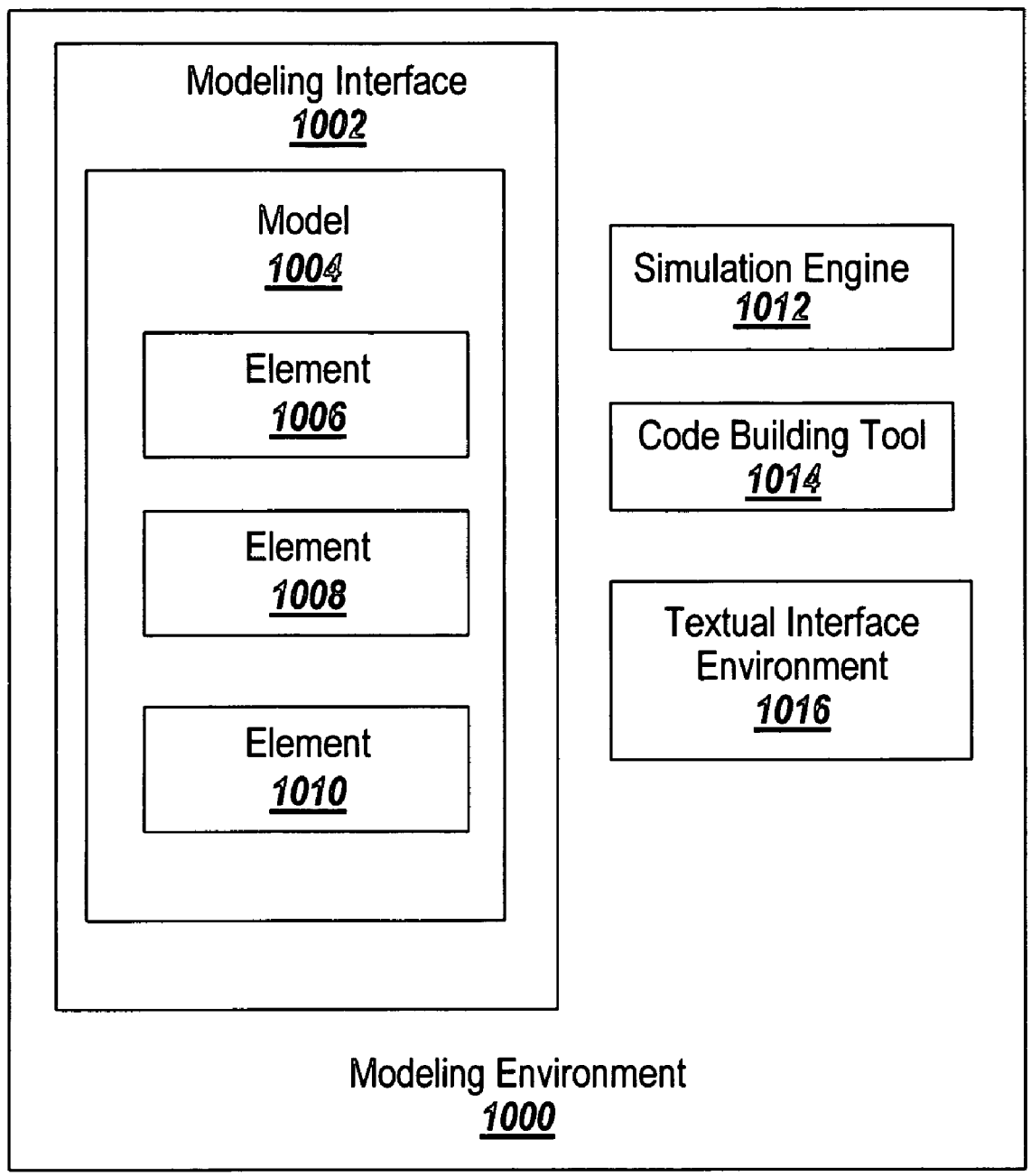
FIG. 10 illustrates a block diagram of an exemplary graphical modeling environment that may be used for implementing one or more embodiments.

FIG. 10 is a block diagram of modeling environment 1000 for modeling, simulating, and analyzing dynamic systems, such as forgoing exemplary systems. Modeling environment 1000 may include a modeling interface 1002, a simulation engine 1012, a code building tool 1014, and a textual interface 1016.

Modeling environment 1000 allows a user to develop models in modeling interface 1002. Using modeling interface 1002, a user can create a model 1004 that includes, for example, an component 1006, an component 1008 and an component 1010. The components may be predefined (e.g., defined by a system) or may be user defined (e.g., user specified). Predefined and/or user defined components may include graphical objects or textual objects that model a system, such as a dynamic system.

Textual interface 1016 may allow a user to develop a user-defined component with a sequence of commands in a textual language. Textual interface 1016 may also facilitate debugging and/or profiling of a model. Alternatively, implementations of modeling environment 1000 may include a separate debugger and profiler.

Simulation engine 1012 may communicate with the modeling interface 1002. Simulation engine 1012 may receive a model such as, for example, a block diagram model, a state diagram model, a Unified Modeling Language (UML) model, a Systems Modeling Language (SysML) model, a text-based model (e.g., a sequence of commands), etc., that is generated using modeling interface 1002. Simulation engine 1012 may convert the model created in modeling interface 1002 to an executable form, referred to as a compiled model. Simulation engine 1012 may repetitively execute the compiled model e.g., via successive time steps from a simulation start time to a stop time specified by the user or until the simulation is interrupted. Alternatively, simulation engine 1012 may enable interpretive simulation of the model.

Code building tool 1014 may be used to generate code, such as source code, object code, a compiled executable or library for forming an executable of a model provided by modeling interface 1002. Code building tool 1014 may also be used to generate a hardware description language representation of the model. Code building tool 1014 may use implementations of code for portions of a model to generate executable code, instructions, etc. in a programming language such as Java, Javascript, C or C++ or a hardware description language such as Verilog or Very High Speed Integrated Circuit Hardware Description Language (VHDL). To generate code, code building tool 1014 may convert a source model language representation of a model to a target language. Code building tool 1014 may comprise an extended version of a code building tool such as the Real-Time Workshop® tool from The MathWorks, Inc. of Natick, Mass. or any portion thereof, or may be substantially any software component for generating executable code, instructions, etc., in a programming language such as Java or C or in a hardware description language such as Verilog or VHDL.

Code building tool 1014 may generate source code for the execution of a model that is provided by modeling interface 1002. Code building tool 1014 may also compile the source code into object code and build an executable program, library or substantially any other form of executable instructions. The code may be designed to run on any processor, microprocessor, dual-core processor, multi-core processor, cluster of processors, operating system, computational hardware device, component of a computational hardware device, etc. In one embodiment, the code may include embedded code targeted to run on an embedded system. Additionally, the code may be customized to run on a specific target hardware platform. For example, the code generated may include fixed-point code to run a fixed-point processor or code may be generated to emulate fixed-point behavior on a floating-point processor.

The components of modeling environment 1000 may be provided on the same computing device, as described below with reference to FIG. 11, or alternatively, the components of modeling environment 1000 may be coupled to each other via a communication network, as described below with reference to FIG. 12.

Figure 11:
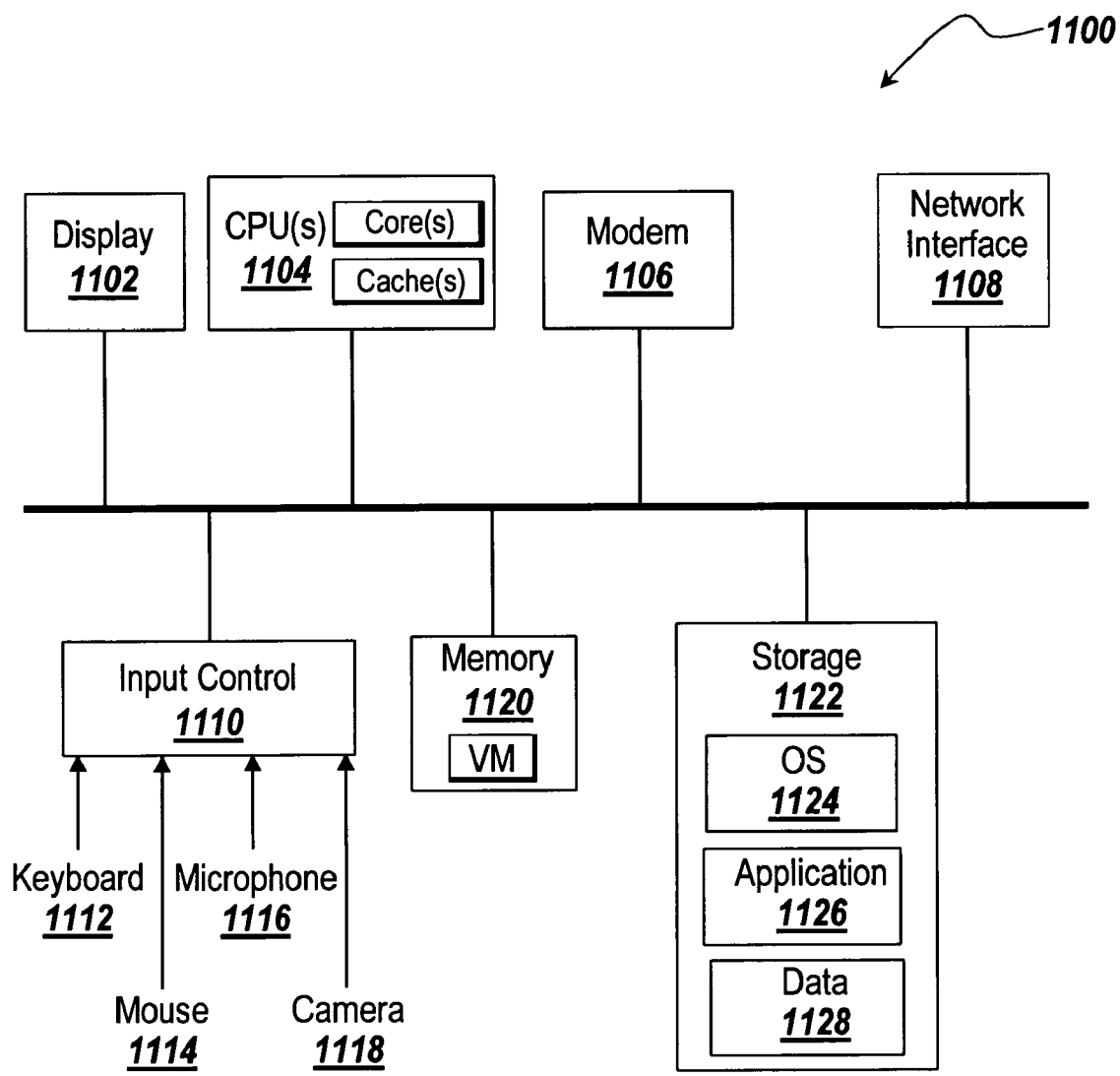
FIG. 11 illustrates an exemplary computing device suitable for practicing one or more exemplary embodiments.

FIG. 11 is an exemplary computing device 1100 suitable for practicing the illustrative embodiment of the present invention. Computing device 1100 is intended to be illustrative and not limiting of the present invention. Computing device 1100 may take many forms, including but not limited to a personal computer, workstation, server, network computer, quantum computer, optical computer, bio computer, Internet appliance, mobile device, a pager, a tablet computer, a smart sensor, and the like.

Computing device 1100 may be electronic and may include a display 1102, a Central Processing Unit (CPU) 1104, a modem 1106, a network interface 1108, an input control 1110, memory 1120, storage 1122, etc. The CPU 1104 may control each component of computing device 1100 to provide modeling environment 1000, simulation engine 1012, textual interface environment 1016, and/or code building tool 1014. Memory 1120 may temporarily store instructions and data. Memory 1120 may provide the instructions to CPU 1104 so that CPU 1104 may operate computing device 1100 and may run modeling environment 1000, simulation engine 1012, textual interface environment 11016, and/or code building tool 1014, based on the stored instructions.

Optionally, computing device 1100 may include multiple CPUs for executing software loaded in memory 1120, and other programs for controlling system hardware. Each of the CPUs may be a single or a multiple core processor. The code loaded in memory 1120 may run in a virtualized environment, such as in a Virtual Machine (VM). Multiple VMs may be resident on a single processor. Also, part of the application may be run in hardware, for example, by configuring a field programmable gate array (FPGA), using an application specific instruction set processor (ASIP) or creating an application specific integrated circuit (ASIC). Further, the part of the applications may be run on analog electronic devices or other resources may be used to run part of the application, such as graphics processing units (GPUs) or dedicated hardware such as Fast Fourier Transform (FFT) processing blocks.

Storage 1122 may contain software tools for applications. Storage 1122 may include code 1124 for the operating system (OS) of device 1100, code 1126 for applications running on the operation system including the applications for modeling interface 1002, simulation engine 1012, code building tool 1014, and textual interface environment 1016. Storage 1122 may also include data 1128 generated from the modeling interface 1002, simulation engine 1012, code building tool 1014, and textual interface environment 1016. Parts of the applications, the data, or the OS may be stored in the CPU cache or memory 1120, or they may be stored on the network described below with reference to FIG. 12.

Input control 1110 may interface with keyboard 1112, mouse 1114, microphone 1116, camera 1118, such as a web camera, or other input devices such as, for example, a motion based input device. Computing device 1100 may receive, through input control 1110, input data, such as the input data for developing a model. Computing device 1100 may display on display 1102 user interfaces for displaying the data generated from modeling interface 1002, simulation engine 1012, code building tool 1014, and textual interface environment 1016.

Figure 12:
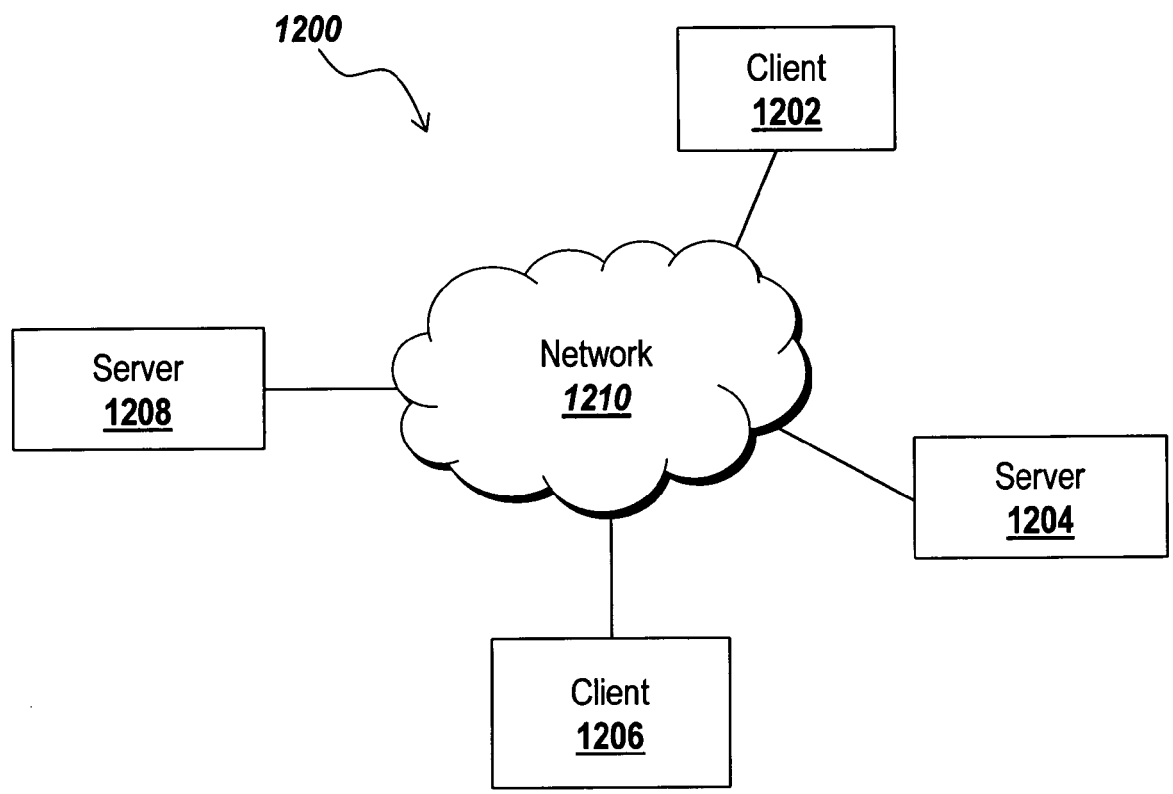
FIG. 12 illustrates an exemplary distributed system suitable for practicing a distributed implementation of an exemplary embodiment.

FIG. 12 is an exemplary network environment 1200 suitable for the distributed implementation of the illustrative embodiment. Network environment 1200 may include one or more servers 1204 and 1208 coupled to clients 1202 and 1206 via a communication network 1210. Modem 1106 and network interface 1108 of computing device 1100 enable servers 1204 and 1208 to communicate with clients 1202 and 1206 through the communication network 1210. Communication network 1210 may include Internet, intranet, Local Area Network (LAN), Wide Area Network (WAN), Metropolitan Area Network (MAN), wireless network (e.g., using IEEE 802.11, IEEE 802.16, and Bluetooth), etc. In addition network 1210 may use middleware, such as Common Object Request Broker Architecture (CORBA) or Distributed Component Object Model (DCOM) to allow a computer on network 1210 to communicate directly with another computer or device that is connected to network 1210. The communication facilities may support the distributed implementations of the present invention. Exemplary embodiments may also employ remote procedure call (RCP) and/or remote method invocation (RMI) may be used.

In network environment 1200, servers 1204 and 1208 may provide clients 1202 and 1206 with software components or products under a particular condition, such as a license agreement. The software components or products may include those for providing modeling environment 1000 and/or implementations of code for select elements. The software components or products may also include those for simulation engine 1012, code building tool 1014, and textual interface environment 1016 coupled to modeling environment 1000.

In one example, client 1202 may perform the modeling of a dynamic system using a software component provided by server 1204 and send server 1204 the model for simulation. Server 1204 may return the simulation results to client 1202 and client 1202 may subsequently display the data to the user with the information on the data.

In another example, client 1202 may have modeling environment 1000 and may desire additional implementations of code for select models. Client 1202 may have implementations of code that are already loaded on client 1202 or may have to download each implementation of code client 1202 desires. In either case, server 1202 may store implementations of code that the user can download. The user may be charged a fee to download the implementation of code. The implementation of code may be specialized code that provides an advantage over an implementation of code client 1202 already has.

In another example, client 1202 may access server 1204 and/or 1208 to access a repository of implementations of code. The implementations of code in the repository may be maintained and updated by an administrator. The repository may serve as a central location to access implementations of code for clients 1202 and 1206. Clients 1202 and 1206 may also be able to upload implementations of code to the repository. Alternatively, clients 1202 and 1206 may access the repository of implementations of code via a network such as the Internet to download or upload implementations of code. The implementations of code may be put under version control in the repository and may have information as well as index terms associated with them. The information can be text or any other format for information storage such as the eXtended Markup Language (XML).

Examples of industries in which control systems are used include, but are not limited to, Aerospace, Automotive, Chemical, Biochemical/Pharmaceutical, Process (e.g., paper mills, etc.). Embodiments of the present invention may be employed and have broad array of applications to all these industries as well as other industries and/or applications.

Exemplary implementations may provide techniques and apparatus for tuning components in a model, such as components for a central system represented in a graphical modeling environment.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

In addition, implementations consistent with principles of the invention can be implemented using devices and configurations other than those illustrated in the figures and described in the specification without departing from the spirit of the invention. Devices and/or components may be added and/or removed from the implementations of FIGS. 10-12 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

Exemplary embodiments are described herein using a block diagram modeling environment, such as a diagram modeling environment provided by Simulink® software from The MathWorks, Inc. of Natick, Mass. Further examples of suitable graphical modeling environments that may be used to develop and/or execute a graphical model in accordance with exemplary embodiments are, but are not limited to, LabVIEW® or MATRIXx from National Instruments, Inc., Mathcad of Mathsoft Engineering & Education Inc., Dymola from Dynasim AB of Lund, Sweden, Extend from Imagine That, Inc. of San Jose, Calif., Scicos from The French National Institution for Research in Computer Science and Control (INRIA), Le Chesnay Cedex, France, MSC.Adams® from MSC.Software Corporation of Santa Ana, Calif., etc. In addition, modeling environments, such as those that support modeling physics-based domains, Unified Modeling Language (UML) like Rhapsody® from iLogix, Inc. of Toronto, Canada or Rational® from International Business Machines Corporation of Armonk, N.Y., or SysML like ARTiSAN Studio from ARTiSAN Software Tools, Inc of Beaverton, Oreg., or SCADE™ from Esterel Technologies, Inc. of Mountain View, Calif. and Elancourt, France, or Rhapsody® from iLogix, Inc., etc., may be suitable for implementing a graphical model in accordance with the exemplary embodiments.

No component, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The invention claimed is:

1. A computer-readable medium holding computer executable instructions that when executed on a processing device manipulate a block diagram model, the medium comprising:
    one or more instructions for defining an open loop location in a block diagram model in accordance with a first user input, wherein the block diagram model is represented by a plurality of graphical modeling components, the plurality of graphical modeling components including compensators;
    one or more instructions for automatically recognizing one or more graphical modeling components that are in series with the open loop location, the one or more graphical modeling components having parameters;
    one or more instructions for displaying a plurality of parameters of the one or more graphical modeling components that are in series with the open loop location on a display device; and
    one or more instructions for simultaneously tuning one or more parameters of the one or more graphical modeling components that are in series with the open loop location in accordance with a second user input.

2. The medium of claim 1, wherein the compensators comprise one or more of gain, integrator or summation components.

3. The medium of claim 1, wherein the one or more instructions for tuning comprise instructions for tuning poles and zeros of the compensators.

4. The medium of claim 1, wherein the one or more instructions for simultaneously tuning one or more parameters of the one or more graphical modeling components in accordance with the second user input comprise:
    one or more instructions for receiving the second input through a graphical user interface (GUI);
    one or more instructions for passing the second input to the one or more graphical modeling components using the GUI; and
    one or more instructions for updating the parameters of the one or more graphical modeling components in accordance with the second input.

5. A computer-readable medium holding computer executable instructions that when executed on a processing device analyze a block diagram model, the medium comprising:
    one or more instructions for identifying factorization points in a block diagram model having a plurality of graphical modeling components, the plurality of graphical modeling components including compensators, wherein each factorization point identifies where the block diagram model is partitioned into two disconnected parts;
    one or more instructions for identifying graphical modeling components between two factorization points;
    one or more instructions for automatically recognizing a pattern of the graphical modeling components between two factorization points; and
    one or more instructions for generating a virtual block diagram model by replacing the pattern of the graphical modeling components between the two factorization points with a single graphical modeling component representing the pattern;
    one or more instructions for identifying whether the block diagram model is a closed-loop block diagram model;
    one or more instructions for defining an open loop location on the block diagram model based on a first user input if the block diagram model is a closed-loop block diagram model; and
    one or more instructions for storing the block diagram model with the open loop location.

6. The medium of claim 5, wherein the single graphical modeling component is selected from a graphical modeling library comprising a plurality of patterns of graphical modeling components.

7. The medium of claim 5, further comprising:
    one or more instructions for tuning one or more parameters of the single graphical modeling component in accordance with a second user input.

8. The medium of claim 7, wherein the single graphical modeling component includes poles and zeros associated with the single graphical modeling component, the medium comprising:
    one or more instructions for tuning the poles and zeros of the single graphical modeling component.

9. In a computing device, a method of manipulating a block diagram model, the method comprising:
    defining an open loop location in the block diagram model based on a first user input, the block diagram model represented by a plurality of graphical modeling components that include parameters, the plurality of graphical modeling components including compensators;
    automatically identifying one or more graphical modeling components that are in series with the open loop location; and
    displaying at least a portion of parameters of the one or more graphical modeling components that are in series with the open loop location on a display device.

10. The method of claim 9 further comprising:
    simultaneously tuning one or more parameters of the one or more graphical modeling components that are in series with the open loop location based on a second user input.

11. The method of claim 10, wherein tuning comprises tuning poles and zeros of the one or more graphical modeling components.

12. The method of claim 10, wherein simultaneously tuning one or more parameters of the one or more graphical modeling components based the second user input comprises:
    receiving the second input through a graphical user interface (GUI);
    passing the second input to the one or more graphical modeling components via the GUI for implementation; and
    instructions for updating the parameters of the one or more graphical modeling components in accordance with the second input.

13. The method of claim 9, wherein the compensators comprise one or more of gain, integrator or summation components.

14. In a computing device, a method of analyzing a block diagram model, the method comprising:
- identifying factorization points in a block diagram model having a plurality of graphical modeling components, the plurality of graphical modeling components including compensators, wherein each factorization point identifies where the block diagram model is partitioned into two disconnected parts;
- automatically recognizing a pattern of the graphical modeling components between two factorization points;
- generating a virtual block diagram model, wherein the pattern of the graphical modeling components between the two factorization points is replaced with a single graphical modeling component representing the pattern; and
- storing the virtual block diagram model in a storage device.

15. The method of claim 14, further comprising defining an open loop location on the block diagram model in accordance with a user input, when the block diagram model is a closed-loop block diagram model.

16. The method of claim 14, wherein the single graphical modeling component representing the pattern of the graphical modeling components between the two factorization points is selected from a graphical modeling library comprising a plurality of patterns of graphical modeling components.

17. The method of claim 14, further comprising:
- tuning one or more parameters of the single graphical modeling component in accordance with a user input.

18. The method of claim 17, wherein the tuning comprises tuning poles and zeros of the single graphical modeling component.

19. A system for interacting with a block diagram model, the system comprising:
- a processor to:
  - identify a location on a block diagram model based on a system instruction, the block diagram model including a plurality of compensators;
  - insert an open loop into the block diagram model at the identified location;
  - automatically recognizing one or more compensators that are in series with the open loop location;
  - tune one or more parameters of the one or more compensators that are in series with the open loop; and
  - produce an output based on the tuning, wherein the output modifies operation of the block diagram model; and
- a display device to:
  - display the block diagram model to a user, and
  - display the open loop, the parameters, tuned parameters, or the output to the user to facilitate user interaction with the block diagram model.

20. The system of claim 19, wherein the processor identifies factorization points in the block diagram model and wherein each factorization point identifies where the block diagram model is partitioned into two disconnected parts.

21. The system of claim 19, wherein the processor identifies patterns of compensators between two factorization points.

22. The system of claim 21, wherein the processor matches the patterns of compensators with patterns form a library of patterns of compensators.

23. The system of claim 21, wherein the processor generates a virtual block diagram model by replacing the pattern of compensators with a single compensator.

* * * * *